United States Patent
Rubenstein

(10) Patent No.: US 11,711,346 B2
(45) Date of Patent: Jul. 25, 2023

(54) SYSTEM AND METHOD FOR NEUTRAL APPLICATION PROGRAMMING INTERFACE

(71) Applicant: UMBRA Technologies Ltd., Hong Kong (CN)

(72) Inventor: Joseph E. Rubenstein, Beijing (CN)

(73) Assignee: UMBRA TECHNOLOGIES LTD., Sar (CN)

( * ) Notice: Subject to any disclaimer, the term of this patent is extended or adjusted under 35 U.S.C. 154(b) by 0 days.

(21) Appl. No.: 15/542,011

(22) PCT Filed: Jan. 5, 2016

(86) PCT No.: PCT/IB2016/000110
§ 371 (c)(1),
(2) Date: Jul. 6, 2017

(87) PCT Pub. No.: WO2016/110785
PCT Pub. Date: Jul. 14, 2016

(65) Prior Publication Data
US 2018/0013732 A1    Jan. 11, 2018

Related U.S. Application Data

(63) Continuation of application No. PCT/US2015/064242, filed on Dec. 7, 2015.
(Continued)

(51) Int. Cl.
*H04L 29/06*    (2006.01)
*H04L 9/40*    (2022.01)
(Continued)

(52) U.S. Cl.
CPC ........ *H04L 63/0428* (2013.01); *H04L 67/104* (2013.01); *H04L 67/34* (2013.01);
(Continued)

(58) Field of Classification Search
CPC ..... H04L 63/0428; H04L 69/12; H04L 67/32; H04L 67/34; H04L 67/104; H04L 69/321; H04L 69/22; H04L 67/42
See application file for complete search history.

(56) References Cited

U.S. PATENT DOCUMENTS 4,890,281 A    12/1989  Balboni et al.
5,828,847 A    10/1998  Gehr et al.
(Continued)

FOREIGN PATENT DOCUMENTS

AU    2014381693 A1    8/2016
CN    1315088 A    9/2001
(Continued)

OTHER PUBLICATIONS

"Operations and Quality of Service Telegraph Services, Global Virtual Network Service," ITU-T Standard, International Telecommunication Union, Geneva, Switzerland, No. F.16, Feb. 21, 1995, (23 pages).
(Continued)

*Primary Examiner* — Taghi T Arani
*Assistant Examiner* — Lin Chang
(74) *Attorney, Agent, or Firm* — Wilmer Cutler Pickering Hale and Dorr LLP

(57) ABSTRACT

Systems and methods for neutral application programming interfaces are disclosed. In one embodiment, the disclosure relates to a system for neutral application programming interfaces. The system may comprise a device. The device may be configured to receive a request. The request may comprise an outer payload and an inner payload. The device may be further configured to parse the outer payload based on a common definition of the outer payload. The device may be further configured to extract information of an action from the outer payload. The device may be further configured
(Continued)

ured to parse the inner payload based on a definition of the action. The device may be further configured to process the action.

41 Claims, 18 Drawing Sheets

Related U.S. Application Data

(60) Provisional application No. 62/266,060, filed on Dec. 11, 2015, provisional application No. 62/174,394, filed on Jun. 11, 2015, provisional application No. 62/151,174, filed on Apr. 22, 2015, provisional application No. 62/144,293, filed on Apr. 7, 2015, provisional application No. 62/108,987, filed on Jan. 28, 2015, provisional application No. 62/100,406, filed on Jan. 6, 2015.

(51) Int. Cl.
*H04L 67/104* (2022.01)
*H04L 69/321* (2022.01)
*H04L 69/12* (2022.01)
*H04L 67/60* (2022.01)
*H04L 67/00* (2022.01)
*H04L 69/22* (2022.01)
*H04L 67/01* (2022.01)

(52) U.S. Cl.
CPC ............ *H04L 67/60* (2022.05); *H04L 69/12* (2013.01); *H04L 69/321* (2013.01); *H04L 67/01* (2022.05); *H04L 69/22* (2013.01)

(56) References Cited

U.S. PATENT DOCUMENTS

| | | | |
|---|---|---|---|
| 5,893,089 A | 4/1999 | Kikinis | |
| 5,940,838 A | 8/1999 | Schmuck et al. | |
| 6,209,039 B1 | 3/2001 | Albright et al. | |
| 6,289,201 B1 | 9/2001 | Weber et al. | |
| 6,374,302 B1 | 4/2002 | Glasso et al. | |
| 6,463,465 B1 | 10/2002 | Nieuwejaar | |
| 6,477,166 B1 | 11/2002 | Sanzi et al. | |
| 6,593,863 B2 | 7/2003 | Pitio | |
| 6,611,587 B2 | 8/2003 | Brown et al. | |
| 6,671,361 B2 | 12/2003 | Goldstein | |
| 6,678,241 B1 | 1/2004 | Gai et al. | |
| 6,693,876 B1 | 1/2004 | Zey | |
| 6,690,223 B1 | 2/2004 | Wan | |
| 6,735,207 B1 | 5/2004 | Prasad et al. | |
| 6,785,295 B1 | 8/2004 | Graf et al. | |
| 6,879,995 B1* | 4/2005 | Chinta | H04L 67/24 709/204 |
| 6,973,048 B2 | 12/2005 | Pitio | |
| 6,996,117 B2 | 2/2006 | Lee et al. | |
| 7,006,505 B1 | 2/2006 | Bleszynski et al. | |
| 7,039,701 B2 | 5/2006 | Wesley | |
| 7,069,318 B2 | 6/2006 | Burbeck et al. | |
| 7,145,882 B2 | 12/2006 | Limaye et al. | |
| 7,145,922 B2 | 12/2006 | Pitio | |
| 7,161,899 B2 | 1/2007 | Limaye et al. | |
| 7,161,965 B2 | 1/2007 | Pitio | |
| 7,173,902 B2 | 2/2007 | Daniell et al. | |
| 7,177,929 B2 | 2/2007 | Burbeck et al. | |
| 7,221,687 B2 | 5/2007 | Shugard | |
| 7,224,706 B2 | 5/2007 | Loeffler-Lejeune | |
| 7,254,833 B1 | 8/2007 | Cornelius et al. | |
| 7,269,130 B2 | 9/2007 | Pitio | |
| 7,310,348 B2 | 12/2007 | Trinh et al. | |
| 7,349,403 B2 | 3/2008 | Lee et al. | |
| 7,349,411 B2 | 3/2008 | Pitio | |
| 7,349,435 B2 | 3/2008 | Giacomini | |
| 7,389,312 B2 | 6/2008 | Ohran | |
| 7,433,964 B2 | 10/2008 | Raguram et al. | |
| 7,551,623 B1* | 6/2009 | Feroz | H04L 41/5009 370/395.21 |
| 7,577,691 B2 | 8/2009 | Novik et al. | |
| 7,587,487 B1* | 9/2009 | Gunturu | H04L 45/00 709/224 |
| 7,633,909 B1 | 12/2009 | Jones et al. | |
| 7,689,722 B1 | 3/2010 | Timms et al. | |
| 7,742,405 B2 | 6/2010 | Trinh et al. | |
| 7,742,411 B2 | 6/2010 | Trinh et al. | |
| 7,801,030 B1 | 9/2010 | Aggarwal et al. | |
| 7,822,877 B2 | 10/2010 | Chong et al. | |
| 7,870,418 B2 | 1/2011 | Sekaran et al. | |
| 7,886,305 B2 | 2/2011 | Ahmed et al. | |
| 7,930,339 B2 | 4/2011 | Tobita et al. | |
| 7,957,311 B2 | 6/2011 | Trinh et al. | |
| 8,010,751 B2 | 8/2011 | Yang et al. | |
| 8,064,909 B2 | 11/2011 | Spinelli et al. | |
| 8,069,258 B1* | 11/2011 | Howell | H04L 65/80 709/230 |
| 8,069,435 B1 | 11/2011 | Lai | |
| 8,073,777 B2 | 12/2011 | Barry et al. | |
| 8,107,363 B1 | 1/2012 | Saluja | |
| 8,239,915 B1 | 8/2012 | Satish et al. | |
| 8,259,571 B1 | 9/2012 | Raphel et al. | |
| 8,266,672 B2 | 9/2012 | Moore | |
| 8,401,028 B2 | 3/2013 | Mihaly et al. | |
| 8,422,397 B2 | 4/2013 | Ansari et al. | |
| 8,437,641 B2 | 5/2013 | Lee et al. | |
| 8,458,786 B1 | 6/2013 | Kailash et al. | |
| 8,544,065 B2 | 9/2013 | Archer et al. | |
| 8,611,335 B1 | 12/2013 | Wu et al. | |
| 8,611,355 B1 | 12/2013 | Sella et al. | |
| 8,625,411 B2 | 1/2014 | Srivivasan et al. | |
| 8,687,791 B1 | 4/2014 | Cordell et al. | |
| 8,699,683 B1 | 4/2014 | Jackson et al. | |
| 8,769,057 B1 | 7/2014 | Breau et al. | |
| 8,798,060 B1 | 8/2014 | Vautrin et al. | |
| 8,854,965 B1 | 9/2014 | Richards | |
| 8,861,344 B2 | 10/2014 | Trinh et al. | |
| 8,874,680 B1 | 10/2014 | Das | |
| 8,966,075 B1 | 2/2015 | Chickering et al. | |
| 8,976,798 B2 | 3/2015 | Border et al. | |
| 9,015,310 B2 | 4/2015 | Ochi | |
| 9,038,151 B1 | 5/2015 | Chua et al. | |
| 9,110,820 B1 | 8/2015 | Bent et al. | |
| 9,164,702 B1 | 10/2015 | Nesbit et al. | |
| 9,164,795 B1* | 10/2015 | Vincent | H04L 12/4633 |
| 9,167,501 B2 | 10/2015 | Kempf et al. | |
| 9,172,603 B2 | 10/2015 | Padmanabhan et al. | |
| 9,213,594 B2 | 12/2015 | Strasser et al. | |
| 9,241,004 B1 | 1/2016 | April | |
| 9,253,028 B2 | 2/2016 | DeCusatis et al. | |
| 9,277,452 B1 | 3/2016 | Aithal et al. | |
| 9,294,304 B2 | 3/2016 | Sindhu | |
| 9,294,497 B1 | 3/2016 | Ben-Or et al. | |
| 9,298,719 B2 | 3/2016 | Noronha et al. | |
| 9,350,644 B2 | 5/2016 | Desai et al. | |
| 9,350,710 B2 | 5/2016 | Herle et al. | |
| 9,351,193 B2 | 5/2016 | Raleigh et al. | |
| 9,369,433 B1 | 6/2016 | Paul et al. | |
| 9,432,258 B2 | 8/2016 | Van der Merwe et al. | |
| 9,432,336 B2 | 8/2016 | Ostrowski | |
| 9,450,817 B1 | 9/2016 | Bahadur et al. | |
| 9,455,924 B2 | 9/2016 | Cicic et al. | |
| 9,461,996 B2 | 10/2016 | Hayton et al. | |
| 9,525,663 B2 | 12/2016 | Yuan et al. | |
| 9,525,696 B2 | 12/2016 | Kapoor et al. | |
| 9,544,137 B1 | 1/2017 | Brandwine | |
| 9,554,061 B1 | 1/2017 | Proctor et al. | |
| 9,565,117 B2 | 2/2017 | Dahod et al. | |
| 9,569,587 B2 | 2/2017 | Ansari et al. | |
| 9,590,820 B1 | 3/2017 | Shukla | |
| 9,590,902 B2 | 3/2017 | Lin et al. | |
| 9,609,003 B1 | 3/2017 | Chmielewski et al. | |
| 9,609,482 B1 | 3/2017 | Want et al. | |
| 9,641,612 B2 | 5/2017 | Yu | |
| 9,699,001 B2 | 7/2017 | Addanki et al. | |
| 9,699,135 B2 | 7/2017 | Dinha | |

(56) References Cited

U.S. PATENT DOCUMENTS

| | | |
|---|---|---|
| 9,729,539 B1 | 8/2017 | Agrawal et al. |
| 9,858,559 B2 | 1/2018 | Raleigh et al. |
| 9,888,042 B2 | 2/2018 | Annamalaisami et al. |
| 9,898,317 B2 | 2/2018 | Nakil et al. |
| 9,948,649 B1 | 4/2018 | Zhao et al. |
| 10,044,678 B2 | 8/2018 | Van der Merwe et al. |
| 10,061,664 B2 | 8/2018 | Verkaik et al. |
| 10,070,369 B2 | 9/2018 | Lynn, Jr. et al. |
| 10,078,754 B1 | 9/2018 | Brandwine et al. |
| 10,079,839 B1 | 9/2018 | Bryan et al. |
| 10,091,304 B2 | 10/2018 | Hoffmann |
| 10,237,253 B2 | 3/2019 | Chen |
| 10,275,267 B1 | 4/2019 | De Kadt et al. |
| 10,331,472 B2 | 6/2019 | Wang |
| 10,574,482 B2 | 2/2020 | Ore et al. |
| 10,673,712 B1* | 6/2020 | Gosar ................. H04L 41/5096 |
| 10,756,929 B2 | 8/2020 | Knutsen et al. |
| 10,904,201 B1 | 1/2021 | Ermagan et al. |
| 10,922,286 B2 | 2/2021 | Rubenstein |
| 11,032,187 B2 | 6/2021 | Hassan |
| 11,092,447 B2 | 8/2021 | Aiello et al. |
| 11,108,595 B2 | 12/2021 | Rubenstein |
| 2002/0007350 A1 | 1/2002 | Yen |
| 2002/0029267 A1 | 3/2002 | Sankuratripati et al. |
| 2002/0046253 A1 | 4/2002 | Uchida et al. |
| 2002/0049901 A1 | 4/2002 | Carvey |
| 2002/0087447 A1 | 7/2002 | McDonald et al. |
| 2002/0186654 A1 | 12/2002 | Tornar |
| 2003/0046529 A1 | 3/2003 | Loison et al. |
| 2003/0110214 A1 | 6/2003 | Sato |
| 2003/0072433 A1 | 8/2003 | Brown et al. |
| 2003/0147403 A1 | 8/2003 | Border et al. |
| 2003/0195973 A1 | 10/2003 | Savarda |
| 2003/0233551 A1* | 12/2003 | Kouznetsov ........ H04L 67/1057 713/175 |
| 2004/0205339 A1 | 10/2004 | Medin |
| 2004/0268151 A1 | 12/2004 | Matsuda |
| 2005/0180319 A1 | 8/2005 | Hutnik et al. |
| 2005/0203892 A1 | 9/2005 | Wesley et al. |
| 2005/0208926 A1 | 9/2005 | Hamada |
| 2005/0235352 A1 | 10/2005 | Staats et al. |
| 2006/0020793 A1 | 1/2006 | Rogers et al. |
| 2006/0031407 A1* | 2/2006 | Dispensa ................. H04L 61/25 709/219 |
| 2006/0031483 A1 | 2/2006 | Lund et al. |
| 2006/0047944 A1 | 3/2006 | Kilian-Kehr |
| 2006/0075057 A1 | 4/2006 | Gildea et al. |
| 2006/0179150 A1 | 8/2006 | Farley et al. |
| 2006/0195896 A1 | 8/2006 | Fulp et al. |
| 2006/0225072 A1 | 10/2006 | Lari et al. |
| 2007/0083482 A1 | 4/2007 | Rathi et al. |
| 2007/0112812 A1 | 5/2007 | Harvey et al. |
| 2007/0165672 A1 | 7/2007 | Keels et al. |
| 2007/0168486 A1* | 7/2007 | McCoy ................... H04L 69/26 709/223 |
| 2007/0168517 A1 | 7/2007 | Weller et al. |
| 2007/0226043 A1 | 9/2007 | Pietsch et al. |
| 2008/0010676 A1 | 1/2008 | Dosa Racz et al. |
| 2008/0043742 A1 | 2/2008 | Pong et al. |
| 2008/0091598 A1* | 4/2008 | Fauleau ................. G06Q 40/02 705/41 |
| 2008/0117927 A1 | 5/2008 | Donhauser et al. |
| 2008/0130891 A1 | 6/2008 | Sun et al. |
| 2008/0168377 A1* | 7/2008 | Stallings ................. H04N 5/765 715/772 |
| 2008/0240121 A1 | 10/2008 | Xiong et al. |
| 2008/0247386 A1 | 10/2008 | Wildfeuer |
| 2008/0256166 A1 | 10/2008 | Branson et al. |
| 2008/0260151 A1* | 10/2008 | Fluhrer ................. H04L 69/28 380/255 |
| 2008/0301794 A1 | 12/2008 | Lee |
| 2009/0003223 A1 | 1/2009 | McCallum et al. |
| 2009/0092043 A1 | 4/2009 | Lapuh et al. |
| 2009/0100165 A1 | 4/2009 | Wesley, Sr. et al. |
| 2009/0106569 A1 | 4/2009 | Roh et al. |
| 2009/0122990 A1 | 5/2009 | Gundavelli et al. |
| 2009/0129386 A1 | 5/2009 | Rune |
| 2009/0132621 A1 | 5/2009 | Jensen et al. |
| 2009/0141734 A1 | 6/2009 | Brown et al. |
| 2009/0144416 A1 | 6/2009 | Chatley et al. |
| 2009/0144443 A1 | 6/2009 | Vasseur et al. |
| 2009/0193428 A1 | 7/2009 | Dalberg et al. |
| 2009/0213754 A1 | 8/2009 | Melamed |
| 2009/0217109 A1 | 8/2009 | Sekaran et al. |
| 2009/0259798 A1 | 10/2009 | Wang et al. |
| 2010/0017603 A1* | 1/2010 | Jones ................... H04L 9/3297 713/168 |
| 2010/0131616 A1 | 5/2010 | Walter et al. |
| 2010/0250700 A1 | 9/2010 | O'Brien et al. |
| 2010/0316052 A1 | 12/2010 | Petersen |
| 2010/0325309 A1 | 12/2010 | Cicic et al. |
| 2011/0007652 A1 | 1/2011 | Bai |
| 2011/0185006 A1 | 7/2011 | Raghav et al. |
| 2011/0231917 A1 | 9/2011 | Chaturvedi et al. |
| 2011/0247063 A1 | 10/2011 | Aabye et al. |
| 2011/0268435 A1 | 11/2011 | Mizutani et al. |
| 2011/0314473 A1 | 12/2011 | Yang et al. |
| 2012/0005264 A1 | 1/2012 | McWhirter et al. |
| 2012/0005307 A1 | 1/2012 | Das et al. |
| 2012/0082057 A1 | 4/2012 | Welin et al. |
| 2012/0105637 A1 | 5/2012 | Yousef et al. |
| 2012/0158882 A1 | 6/2012 | Oehme et al. |
| 2012/0179904 A1 | 7/2012 | Dunn et al. |
| 2012/0185559 A1 | 7/2012 | Wesley, Sr. et al. |
| 2012/0188867 A1 | 7/2012 | Fiorone et al. |
| 2012/0196646 A1 | 8/2012 | Crinon et al. |
| 2012/0210417 A1 | 8/2012 | Shieh |
| 2012/0210434 A1 | 8/2012 | Curtis et al. |
| 2012/0270580 A1 | 10/2012 | Anisimov et al. |
| 2012/0320916 A1 | 12/2012 | Sebastian |
| 2013/0070751 A1 | 3/2013 | Atwal et al. |
| 2013/0110787 A1 | 5/2013 | Garimella et al. |
| 2013/0173900 A1 | 7/2013 | Liu |
| 2013/0247167 A1 | 9/2013 | Paul et al. |
| 2013/0259465 A1 | 10/2013 | Blair |
| 2013/0283118 A1 | 10/2013 | Rayner |
| 2013/0286835 A1 | 10/2013 | Plamondon et al. |
| 2013/0287037 A1 | 10/2013 | Bush et al. |
| 2013/0308471 A1 | 11/2013 | Krzanowski et al. |
| 2013/0318233 A1 | 11/2013 | Biswas et al. |
| 2013/0322255 A1 | 12/2013 | Dillon |
| 2013/0343180 A1 | 12/2013 | Kini et al. |
| 2014/0020942 A1 | 1/2014 | Cho et al. |
| 2014/0026179 A1 | 1/2014 | Deverajan et al. |
| 2014/0071835 A1 | 3/2014 | Sun et al. |
| 2014/0086253 A1 | 3/2014 | Yong |
| 2014/0101036 A1* | 4/2014 | Phillips ................. G06Q 20/322 705/39 |
| 2014/0108665 A1* | 4/2014 | Arora ................... G06F 9/5077 709/227 |
| 2014/0149549 A1 | 5/2014 | Fu |
| 2014/0149552 A1 | 5/2014 | Carney et al. |
| 2014/0169214 A1 | 6/2014 | Nakajima |
| 2014/0181248 A1 | 6/2014 | Deutsch et al. |
| 2014/0199962 A1 | 7/2014 | Mohammed et al. |
| 2014/0210693 A1 | 7/2014 | Bhamidipati et al. |
| 2014/0215059 A1 | 7/2014 | Astiz Lezaun et al. |
| 2014/0226456 A1 | 8/2014 | Khan et al. |
| 2014/0229945 A1 | 8/2014 | Barkai et al. |
| 2014/0237464 A1 | 8/2014 | Waterman et al. |
| 2014/0250066 A1 | 9/2014 | Calkowski et al. |
| 2014/0269712 A1 | 9/2014 | Kidambi |
| 2014/0269728 A1 | 9/2014 | Jalan et al. |
| 2014/0278543 A1 | 9/2014 | Kasdon |
| 2014/0280911 A1 | 9/2014 | Wood et al. |
| 2014/0289826 A1 | 9/2014 | Croome |
| 2014/0304728 A1 | 10/2014 | Wendling |
| 2014/0310243 A1 | 10/2014 | McGee et al. |
| 2014/0324931 A1 | 10/2014 | Grube et al. |
| 2014/0331309 A1* | 11/2014 | Spiers ................. H04L 63/0281 726/12 |
| 2014/0337459 A1 | 11/2014 | Kuang et al. |
| 2014/0341023 A1 | 11/2014 | Kim et al. |

(56) References Cited

U.S. PATENT DOCUMENTS

| | | | |
|---|---|---|---|
| 2014/0351939 A1 | 11/2014 | Moore et al. | |
| 2014/0359704 A1 | 12/2014 | Chen | |
| 2014/0362712 A1 | 12/2014 | Agrawal et al. | |
| 2014/0366119 A1 | 12/2014 | Floyd et al. | |
| 2014/0369230 A1 | 12/2014 | Nallur | |
| 2015/0006596 A1 | 1/2015 | Fukui et al. | |
| 2015/0056960 A1 | 2/2015 | Egner et al. | |
| 2015/0063117 A1 | 3/2015 | DiBurro et al. | |
| 2015/0063360 A1 | 3/2015 | Thakkar et al. | |
| 2015/0086018 A1 | 3/2015 | Harjula et al. | |
| 2015/0089582 A1 | 3/2015 | Dilley et al. | |
| 2015/0095384 A1 | 4/2015 | Antony et al. | |
| 2015/0121532 A1 | 4/2015 | Barel | |
| 2015/0128246 A1 | 5/2015 | Feghali et al. | |
| 2015/0207812 A1 | 7/2015 | Back et al. | |
| 2015/0222633 A1 | 8/2015 | Smith et al. | |
| 2015/0222637 A1 | 8/2015 | Hung et al. | |
| 2015/0248434 A1 | 9/2015 | Avati et al. | |
| 2015/0271104 A1 | 9/2015 | Chikkamath et al. | |
| 2015/0281176 A1 | 10/2015 | Banfield | |
| 2015/0326588 A1 | 11/2015 | Vissamsetty et al. | |
| 2015/0341223 A1 | 11/2015 | Shen et al. | |
| 2015/0363230 A1* | 12/2015 | Kasahara | G06F 9/4881 718/106 |
| 2016/0006695 A1 | 1/2016 | Prodoehl et al. | |
| 2016/0028586 A1 | 1/2016 | Blair | |
| 2016/0028770 A1 | 1/2016 | Raleigh et al. | |
| 2016/0048938 A1 | 2/2016 | Jones et al. | |
| 2016/0055323 A1 | 2/2016 | Stuntebeck et al. | |
| 2016/0077745 A1 | 3/2016 | Patel et al. | |
| 2016/0105530 A1 | 4/2016 | Shribman et al. | |
| 2016/0117277 A1 | 4/2016 | Raindel et al. | |
| 2016/0119279 A1 | 4/2016 | Maslak et al. | |
| 2016/0127492 A1* | 5/2016 | Malwankar | G06F 3/0614 709/212 |
| 2016/0134528 A1 | 5/2016 | Lin et al. | |
| 2016/0134543 A1 | 5/2016 | Zhang et al. | |
| 2016/0165463 A1 | 6/2016 | Zhang | |
| 2016/0224460 A1 | 8/2016 | Bryant et al. | |
| 2016/0226755 A1 | 8/2016 | Hammam et al. | |
| 2016/0255556 A1 | 9/2016 | Michel et al. | |
| 2016/0261575 A1 | 9/2016 | Maldaner | |
| 2016/0285977 A1 | 9/2016 | Ng et al. | |
| 2016/0308762 A1 | 10/2016 | Teng et al. | |
| 2016/0330736 A1 | 11/2016 | Polehn et al. | |
| 2016/0337223 A1 | 11/2016 | Mackay | |
| 2016/0337484 A1 | 11/2016 | Tola | |
| 2016/0352628 A1 | 12/2016 | Reddy et al. | |
| 2016/0364158 A1 | 12/2016 | Narayanan et al. | |
| 2016/0366233 A1 | 12/2016 | Le et al. | |
| 2017/0063920 A1 | 3/2017 | Thomas et al. | |
| 2017/0078922 A1 | 3/2017 | Raleigh et al. | |
| 2017/0105142 A1 | 4/2017 | Hecht et al. | |
| 2017/0201556 A1 | 7/2017 | Fox et al. | |
| 2017/0230821 A1 | 8/2017 | Chong et al. | |
| 2017/0344703 A1 | 11/2017 | Ansari et al. | |
| 2018/0013583 A1 | 1/2018 | Rubenstein et al. | |
| 2018/0024873 A1* | 1/2018 | Milliron | G06F 11/3089 719/318 |
| 2018/0091417 A1 | 3/2018 | Ore et al. | |
| 2018/0198756 A1 | 7/2018 | Dawes | |
| 2020/0382341 A1 | 12/2020 | Ore et al. | |
| 2021/0044453 A1 | 2/2021 | Knutsen et al. | |
| 2021/0342725 A1 | 11/2021 | Marsden et al. | |
| 2021/0345188 A1 | 11/2021 | Shaheen | |

FOREIGN PATENT DOCUMENTS

| | | |
|---|---|---|
| CN | 1392708 A | 1/2003 |
| CN | 1536824 A | 10/2004 |
| CN | 1754161 A | 3/2006 |
| CN | 1829177 A | 9/2006 |
| CN | 101079896 A | 11/2007 |
| CN | 101282448 A | 10/2008 |
| CN | 101478533 A | 7/2009 |
| CN | 101599888 A | 12/2009 |
| CN | 101765172 A | 6/2010 |
| CN | 101855865 A | 10/2010 |
| CN | 101969414 A | 2/2011 |
| CN | 102006646 A | 4/2011 |
| CN | 102209355 A | 10/2011 |
| CN | 102340538 A | 2/2012 |
| CN | 102457539 A | 5/2012 |
| CN | 102687480 A | 9/2012 |
| CN | 102739434 | 10/2012 |
| CN | 103118089 A | 5/2013 |
| CN | 103384992 A | 11/2013 |
| CN | 103828297 A | 5/2014 |
| CN | 102255794 B | 7/2014 |
| CN | 104320472 A | 1/2015 |
| EP | 1498809 A1 | 1/2005 |
| EP | 1530761 A2 | 5/2005 |
| EP | 1635253 A2 | 3/2006 |
| EP | 2154834 A1 | 2/2010 |
| EP | 2357763 A1 | 8/2011 |
| JP | 6430499 B2 | 11/2018 |
| WO | WO-02/33551 A1 | 4/2002 |
| WO | WO-2003025709 A2 | 3/2003 |
| WO | WO-03/041360 A2 | 5/2003 |
| WO | WO-2003/090018 A2 | 10/2003 |
| WO | WO-2003088047 A1 | 10/2003 |
| WO | WO-2003090017 A2 | 10/2003 |
| WO | WO-2005065035 A2 | 7/2005 |
| WO | WO-2006/055838 A2 | 5/2006 |
| WO | WO-2008/058088 A1 | 5/2008 |
| WO | WO-2008/067323 A2 | 6/2008 |
| WO | WO-2010/072030 A1 | 7/2010 |
| WO | WO-2012100087 A2 | 7/2012 |
| WO | WO-2013068530 A2 | 5/2013 |
| WO | WO-2013/120069 A1 | 8/2013 |
| WO | WO-2013135753 A1 | 9/2013 |
| WO | WO-2015/021343 A1 | 2/2015 |
| WO | WO-2016073361 A1 | 5/2016 |
| WO | WO-2016/094291 A1 | 6/2016 |
| WO | WO-2016/110785 A1 | 7/2016 |
| WO | WO-2016/123293 A1 | 8/2016 |
| WO | WO-2016/162748 A1 | 10/2016 |
| WO | WO-2016/162749 A1 | 10/2016 |
| WO | WO-2016/164612 A1 | 10/2016 |
| WO | WO-2016/198961 A2 | 12/2016 |
| WO | WO-2018049649 A1 | 3/2018 |

OTHER PUBLICATIONS

"Open Radio Equipment Interface (ORI); ORI Interface Specification; Part 2: Control and Management (Release 4)," Group Specification, European Telecommunications Standards Institute (ETSI), 650, Route des Lucioles; F-06921 Sophia-Antipolis; France, vol. ORI, No. V4.1.1, Oct. 1, 2014 (185 pages).

Robert Russell, "Introduction to RDMA Programming," Copyright 2012, retrieved from the Internet: URL:web.archive.org/web/20140417205540/http://www.cs.unh.edu/~rdr/rdma-intro-module.ppt (76 pages).

Baumgartner, A., et al., "Mobile core network virtualization: A model for combined virtual core network function placement and topology optimization," Proceedings of the 2015 1st IEEE Conference on Network Softwarization (NetSoft), London, UK, 2015, pp. 1-9, doi: 10.1109/NETSOFT, 2015 (9 pages).

Chen, Y., et al., "Resilient Virtual Network Service Provision in Network Virtualization Environments," 2010 IEEE 16th International Conference on Parallel and Distributed Systems, Shanghai, China, 2010, pp. 51-58, doi: 10.1109/ICPADS.2010.26., 2010 (8 pages).

Chowdhury, N.M.M.K et al., "Virtual Network Embedding with Coordinated Node and Link Mapping", IEEE Communications Society Subject Matter Experts for Publication in the IEEE Infocom 2009, pp. 783-791. (Year: 2009) (9 pages).

Definition of "backbone" in Microsoft Computer Dictionary, 2002, Fifth Edition, Microsoft Press (2 pages).

(56) References Cited

OTHER PUBLICATIONS

Definition of "server" in Microsoft Computer Dictionary, 2002, Fifth Edition, Microsoft Press (3 pages).
Examination Report, dated Aug. 2, 2018, for European Patent Application No. 16734942.2 (8 pages).
Examination Report, dated Jul. 20, 2017, for Chinese Application No. 201680004969.3 (1 page).
Examination Report, dated Mar. 3, 2020, for Chinese Application No. 201680020937.2 (9 pages).
Examination Report, dated Mar. 5, 2020, for Chinese Patent Application No. 201580066318.2 (10 pages).
Examination Report, dated Oct. 19, 2018, for European Patent Application No. 16727220.2 (11 pages).
Extended European Search Report dated Sep. 7, 2018 received in related European Patent Application No. 16744078.3 (7 pages).
Extended European Search Report, dated Aug. 2, 2018, for European Patent Application No. 15866542.2 (8 pages).
Extended European Search Report, dated Sep. 7, 2018, for European Patent Application No. 16777297.9 (4 pages).
Extended Search Report, dated Nov. 29, 2018, for European Patent Application No. 16806960.7 (10 pages).
Figueiredo, R. J., et al., "Social VPNs: Integrating Overlay and Social Networks for Seamless P2P Networking," 2008 IEEE 17th Workshop on Enabling Technologies: Infrastructure for Collaborative Enterprises, Rome, Italy, 2008, pp. 93-98, doi: 10.1109/WETICE.2008.43, 2008 (6 pages).
Gong, L. et al., "Revenue-Driven Virtual Network Embedding Based on Global Resource Information", Globecom 2013, Next Generation Networking Symposium, pp. 2294-2299. (Year: 2013) (6 pages).
Haeri, S. et al., "Global Resource Capacity Algorithm with Path Splitting for Virtual Network Embedding", 2016 IEEE, pp. 666-669. (Year: 2016) (4 pages).
International Search Report and Written Opinion, dated Apr. 8, 2016, for International Application No. PCT/US2016/015278 (9 pages).
International Search Report and Written Opinion, dated Aug. 10, 2016, for International Application No. PCT/IB2016/000531 (20 pages).
International Search Report and Written Opinion, dated Aug. 23, 2017, for International Application No. PCT/IB2017/000580 (6 pages).
International Search Report and Written Opinion, dated Dec. 28, 2016, for International Application No. PCT/IB2016/001161 (7 pages).
International Search Report and Written Opinion, dated Feb. 12, 2016, for International Application No. PCT/US2015/064242 (9 pages).
International Search Report and Written Opinion, dated Jul. 28, 2017, for International Application No. PCT/IB2017/000557 (6 pages).
International Search Report and Written Opinion, dated Jul. 7, 2016, for International Application No. PCT/US2016/026489 (7 pages).
International Search Report and Written Opinion, dated Jun. 7, 2016, for International Application No. PCT/IB2016/000110 (8 pages).
International Search Report and Written Opinion, dated May 11, 2017, for International Application No. PCT/IB2016/001867 (13 pages).
International Search Report and Written Opinion, dated Sep. 1, 2017, for International Application No. PCT/IB2017/000613 (7 pages).
International Search Report and Written Opinion, dated Sep. 23, 2016, for International Application No. PCT/IB2016/000528 (11 pages).
Office Action, dated Jun. 3, 2020, for Chinese Patent Application No. 201680066545.X (11 pages).
Office Action, dated Mar. 12, 2020, for Chinese Patent Application No. 201680032657.3 (5 pages).
Office Action, dated Mar. 13, 2020, received in related Chinese Patent Application No. 201680021239.4 (9 pages).
Office Action, dated May 7, 2020, for Chinese Patent Application No. 201680020878.9 (7 pages).
Supplementary Partial European Search Report, dated May 20, 2019, for European Patent Application No. 16872483.9 (8 pages).
Szeto, W. et al., "A multi-commodity flow based approach to virtual network resource allocation," GLOBECOM'03. IEEE Global Telecommunications Conference (IEEE Cat. No. 03CH37489), San Francisco, CA, USA, 2003, pp. 3004-3008, vol. 6, doi: 10.1109/GLOCOM.2003.1258787, 2003 (5 pages).
Supplementary European Search Report, dated Dec. 11, 2019, for European Patent Application No. 17788882.3 (8 pages).
Marinos, et al., "Network Stack Specialization for Performance", SIGCOMM '14 Chicago Illinois, Aug. 17-22, 2014, pp. 175-186 (12 pages).
Gkantsidis, et al., "Network Coding for Large Scale Content Distribution", INFOCOM 2005, Miami, Florida, Mar. 13-17, pp. 2235-2245, 2005 (11 pages).

* cited by examiner

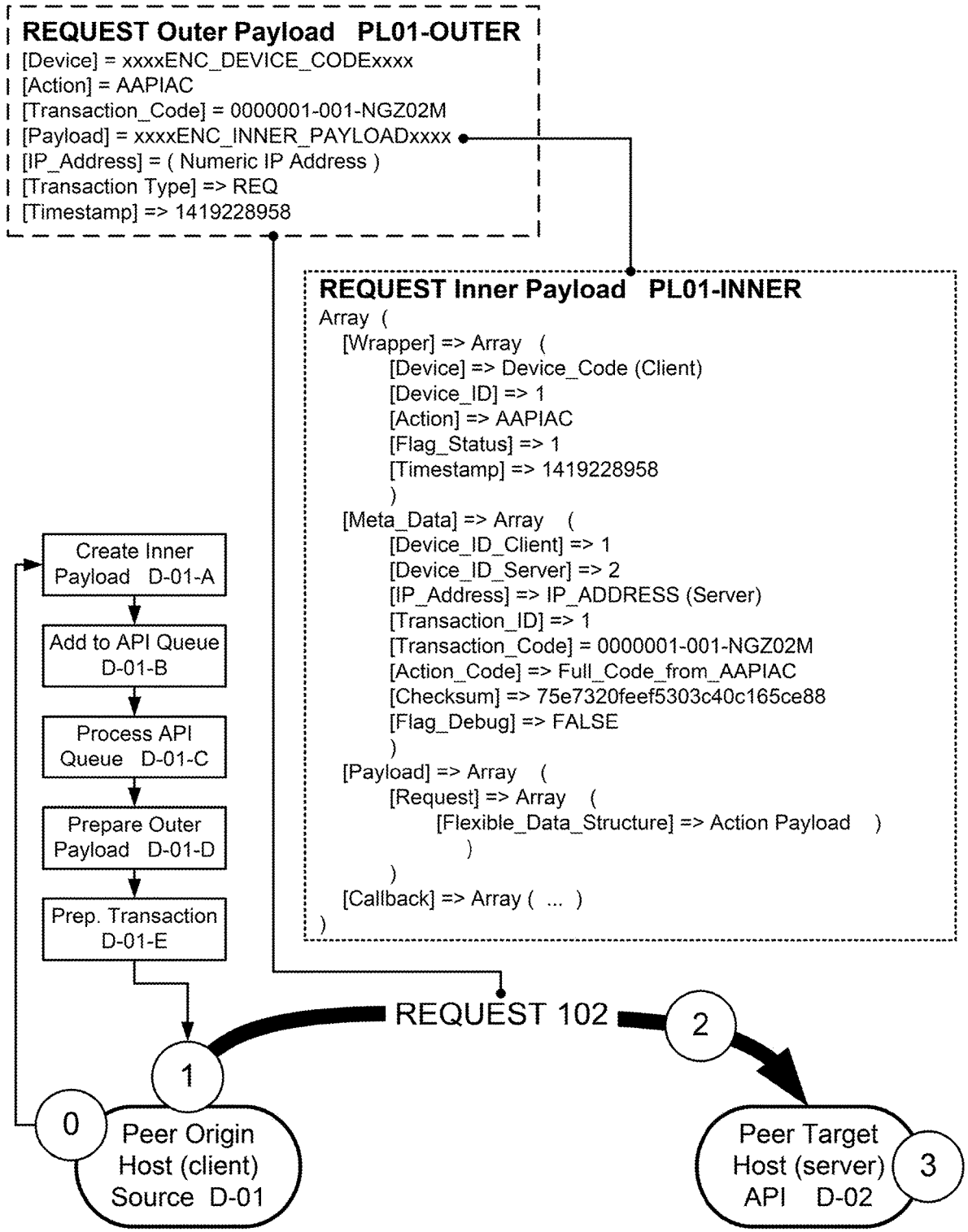
Figure 5-A

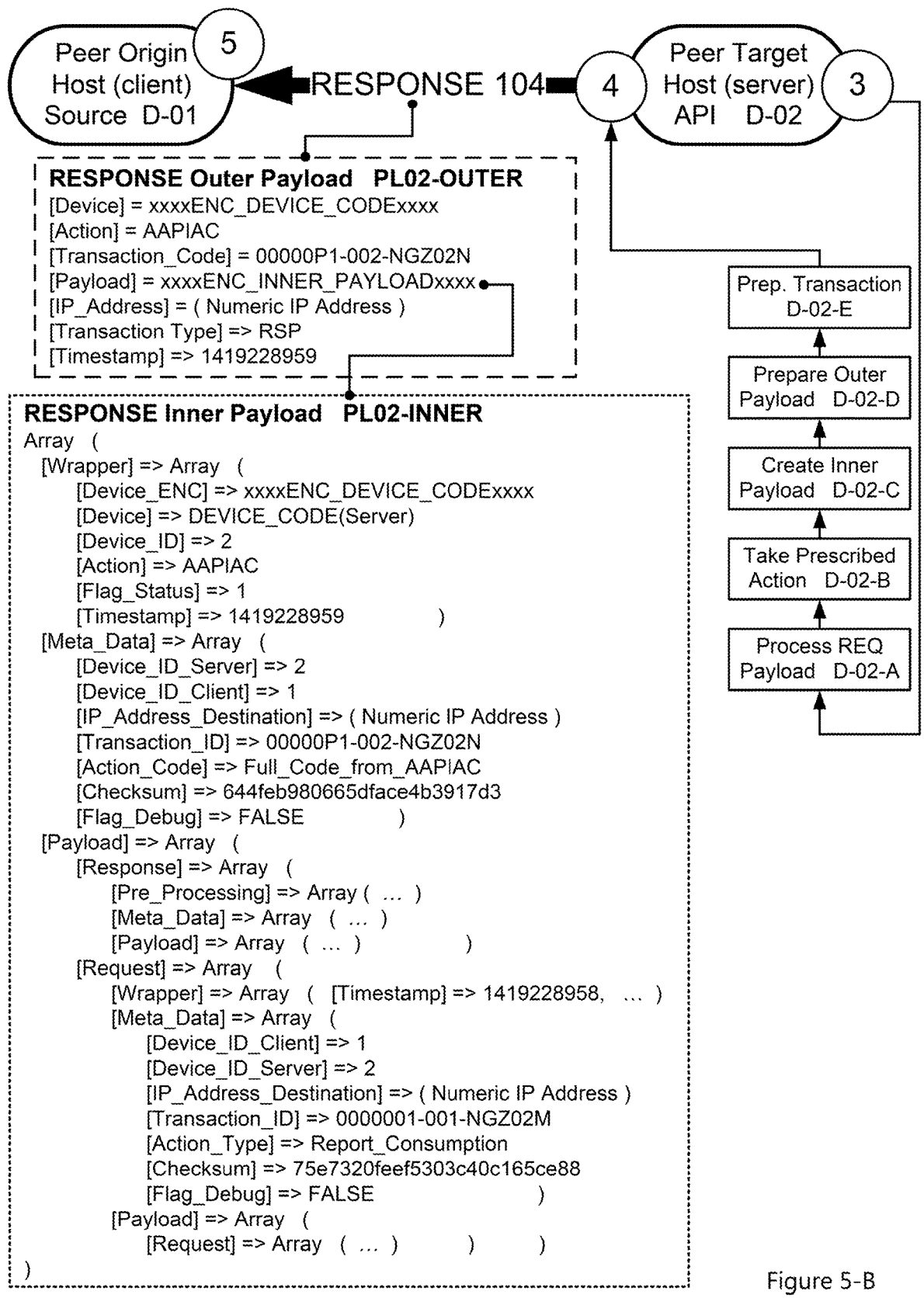
Figure 5-B

SYSTEM AND METHOD FOR NEUTRAL APPLICATION PROGRAMMING INTERFACE

This application is a U.S. National Stage application under 35 U.S.C. § 371 of International Patent Application No. PCT/IB2016/000110, filed Jan. 5, 2016, which claims the benefit of and priority to U.S. Provisional Application No. U.S. 62/100,406 filed on Jan. 6, 2015; U.S. Provisional Application No. 62/108,987 filed on Jan. 28, 2015; U.S. Provisional Application No. 62/144,293 filed on Apr. 7, 2015; U.S. Provisional Application No. 62/151,174 filed on Apr. 22, 2015; U.S. Provisional Application No. 62/174,394 filed on Jun. 11, 2015, International Application No. PCT/US2015/064242 filed on Dec. 7, 2015, and U.S. Provisional Application No. 62/266,060 filed on Dec. 11, 2015, all of which are incorporated herein by reference. U.S. Provisional Application No. 62/089,113 filed on Dec. 8, 2014, the entire contents of each are incorporated herein by reference.

FIELD OF THE DISCLOSURE

The present disclosure relates generally to networks, and more particularly, to the automated flow and exchange of information in device-to-device communications via a neutral application programming interface (API) mechanism.

BACKGROUND OF THE DISCLOSURE

There are times when devices need to communicate with each other. Sometimes this communication is to convey or report static info such as log record, or a content update, or different data. One device may need to query another device to get the current foreign exchange rate between two currencies or fetch a stock price quote, both time-sensitive data which regularly fluctuate. Another communication could also be transactional in nature such as the authorization of a payment by credit card presented by a customer to a merchant to settle a purchase. Other device-to-device sharing of information could be related to the building of a secure tunnel where info such as keys, credentials and connection settings are required by each device.

An Application Programming Interface (API) is a framework for such device to device communications facilitating automated info exchange from a client device making a query to a listening server device which will answer and send back a response to the initiating client device. The client device and server device may constitute a pair of peers or peer pair.

A common type of API is a request-response API post mechanism with a specific data structure payload presented from a client peer to a server peer at a specific URL with a response returned in a specific data structure payload. This is generally for posted information to be processed by a sole-purpose script on a remote server with a result sent back to the initiating client device. A use for this could be a request for credit card info presented with transaction data such as vendor's merchant account info, purchaser related information and purchase amount for processing with either a decline or authorization message returned as a response. This API type will in most cases reject incomplete or malformed or incorrect data structure payloads. This type of API can require security protocols to be followed such as presentation of certificates, HTTPS encryption, keys, or other methods. There are advantages and disadvantages to such an API. It is ideal for a single purpose and is designed for high volume. It allows for many third party clients to be able to query it such as in the case of a credit card transaction authorization API. In other use cases, implementation may be too complicated or undesirable for the purpose which this type of API is to be used.

It is common for an API call to be made to a specific URL and path to be processed by a specific handler. If another type of API transaction needs to be made, it is to another URL and path to be processed by a different handler and corresponding script. Each individual API call will require a certain amount of development on the client-side to implement and to integrate this functionality into the system. Another consideration is the development time, work and effort required to implement security, logging and other required tasks on both the client-side and the server-side related to each type of API info exchange instance when integrating functionality into systems.

In view of the foregoing, it may be understood that there may be significant need to address the short-comings of single purpose API post loops and allow for greater security and flexibility.

SUMMARY OF THE DISCLOSURE

Systems and methods for neutral application programming interfaces are disclosed. In one embodiment, the disclosure relates to a system for neutral application programming interfaces. The system may comprise a device. The device may be configured to receive a request. The request may comprise an outer payload and an inner payload. The device may be further configured to parse the outer payload based on a common definition of the outer payload. The device may be further configured to extract information of an action from the outer payload. The device may be further configured to parse the inner payload based on a definition of the action. The device may be further configured to process the action.

In accordance with other aspects of this embodiment, the outer payload comprises a timestamp of a time when the request is generated.

In accordance with other aspects of this embodiment, the inner payload is encrypted and the device is further configured to decrypt the inner payload.

In accordance with other aspects of this embodiment, the device is configured not to process the action if a time lapse between when the device receives the request and the timestamp is beyond a threshold.

In accordance with other aspects of this embodiment, the threshold is based on network latency.

In accordance with other aspects of this embodiment, the threshold is equal to 1 second.

In accordance with other aspects of this embodiment, the encryption of the inner payload is based on the timestamp and the action.

In accordance with other aspects of this embodiment, the encryption of the inner payload is further based on an originating device that originates the request and the device.

In accordance with other aspects of this embodiment, the request is transmitted via a secure sockets layer.

In accordance with other aspects of this embodiment, the inner payload comprises at least one of an array, a key value pair, an object, a data file, or a binary file.

In accordance with other aspects of this embodiment, the device is further configured to process the action with a script.

In accordance with other aspects of this embodiment, the device is further configured to retrieve the action from a server.

In accordance with other aspects of this embodiment, the server is configured to store information about actions and store information about devices.

In accordance with other aspects of this embodiment, the server is further configured to store a peer relationship of an originating device and a destination device.

In accordance with other aspects of this embodiment, the server is further configured to update an action.

In accordance with other aspects of this embodiment, the device is further configured to retrieve a list of its peer originating devices from the server; and listens to requests from a device that is on the list of its peer originating devices.

In accordance with other aspects of this embodiment, the server is further configured to push an action to the device.

In accordance with other aspects of this embodiment, the server is further configured to flag an action to denote availability.

In accordance with other aspects of this embodiment, the device is further configured to: send a response of the request.

In accordance with other aspects of this embodiment, the device is further configured to include a portion of the request in the response.

In another embodiment, the disclosure relates to a method for neutral application programming interfaces. According to the method, a request may be received. The request may comprise an outer payload and an inner payload. The outer payload may be parsed based on a common definition of the outer payload. Information of an action may be extracted from the outer payload. The inner payload may be parsed based on a definition of the action. The action may be processed.

In still another embodiment, the disclosure relates to a non-transitory computer readable medium storing a computer-readable program of neutral application programming interfaces. The program may include computer-readable instructions to receive a request. The request may comprise an outer payload and an inner payload. The program may include computer-readable instructions to parse the outer payload based on a common definition of the outer payload. The program may include computer-readable instructions to extract information of an action from the outer payload. The program may include computer-readable instructions to parse the inner payload based on a definition of the action. The program may include computer-readable instructions to process the action.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals or references. These drawings should not be construed as limiting the present disclosure, but are intended to be illustrative only.

FIG. 5A shows a diagram illustrating an example request payload array, in accordance with an embodiment of the present disclosure.

FIG. 5B shows a diagram illustrating an example response payload array, in accordance with an embodiment of the present disclosure.

DETAILED DESCRIPTION OF EMBODIMENTS

Figure 1:
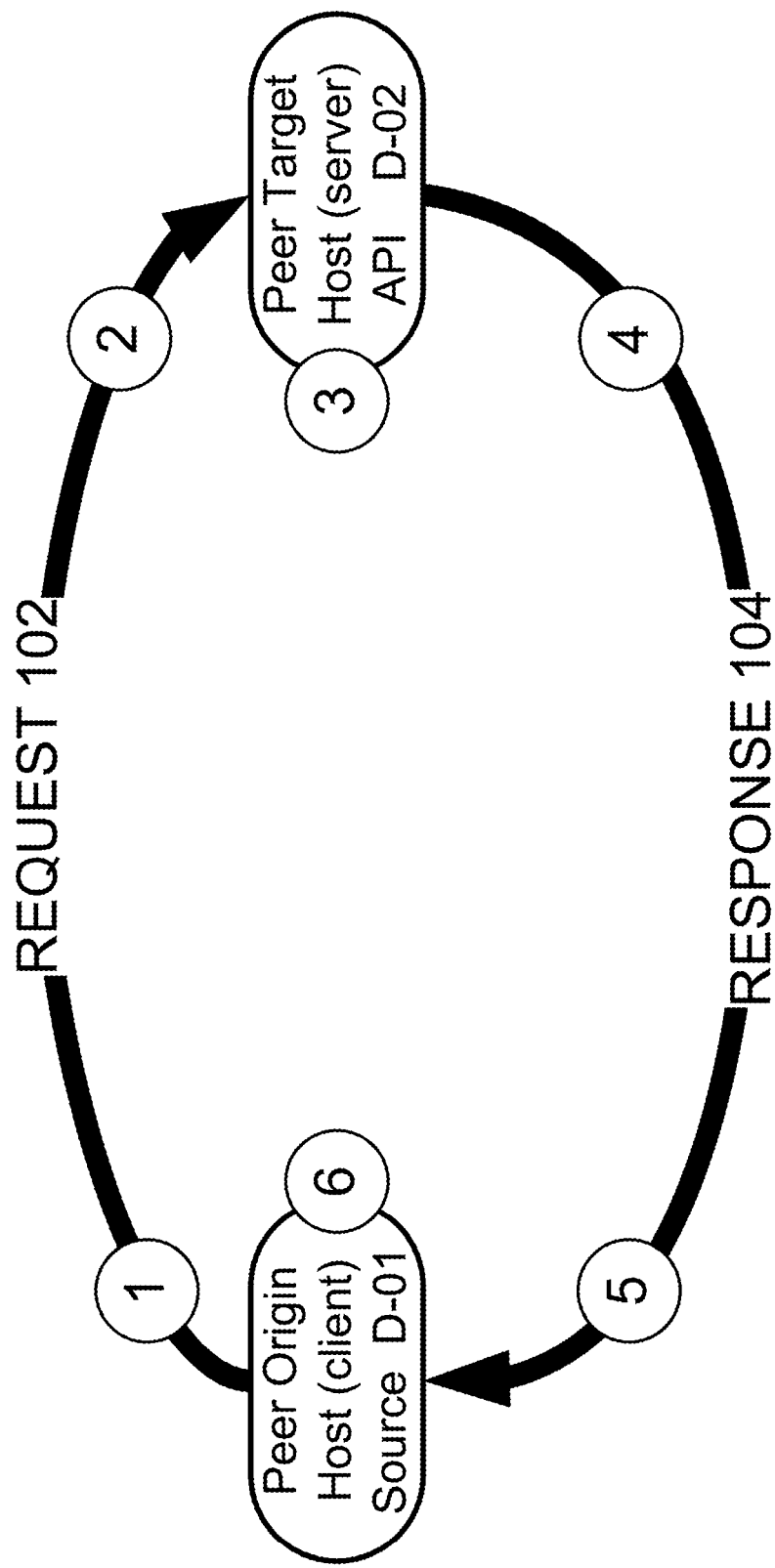
FIG. 1 shows a flow diagram of how an application program interface works, in accordance with an embodiment of the present disclosure.

In some embodiments, the neutral application programming interface (API) mechanism (NAPIM) disclosed herein may be a component of a complex type of network, such as Global Virtual Network (GVN), which needs to dynamically scale across many devices, and in which there exist requirements as follows: add new API call patterns; change existing API call patterns; use a common transport, security and logging framework; retire obsolete API call patterns; have advanced features to be able to carry any payload; dynamically add, remove or edit the API relationship information between peer pairs, including information about a peer itself or related peers which they connect to or which connect to them; allow a device to act contextually as either a server, or a client, or both client and server at different times depending on its role in a specific peer pair API transaction or relationship or transactional relationship; have all API clients and API servers be registered on central servers through API peer to control server API calls which allow for the dynamic updating of API mechanism structure info matrix; and other requirements.

In some embodiments, the NAPIM may be utilized to propagate updates, including maintaining an updated list of peer pairs, credentials between peer pairs, list of API actions, logs and other information.

In some embodiments, as an advantage of this flexible topology, some devices may act as a client in one exchange of information or as a server in another exchange of API information. An API client host may trigger an API call initiating the sending of an API Request to a server host peer and the client will parse and process the response received back. An API server host may have a listener which listens for Request posts initiated from API client hosts. Upon receipt of the Request, the API server host parses and processes it and then prepares the Response to be sent back.

In some embodiments, for security reasons, a device's API listener may be closed during times that it does not need to act as a server and during other times the API listener may be opened so that it can act as an API server.

In some embodiments, a central control server (SRV_CN-TRL) may exist in the NAPIM system disclosed herein. A device in the NAPIM system may be registered on the central control server. The central control server may manage the device, including, but not limited to, environment and software of the device. The central control server may exist in a Global Virtual Network. For redundancy, there may be multiple central control servers in various locations.

The neutrality of the APIs may be maintained regardless of payload carried, predicated by the universal pattern of outer payload, with triggering and processing of defined data structure of the various possible inner payloads determined by a specified action code. Therefore, an unlimited number of API actions may be possible through a NAPIM.

An action's functional state may be operational upon the presentation of action information to a related script trigger on a client peer, which is then transported via the request sender of the NAPIM on client peer to the request handler and processor scripts on server peer activating the scripts there. The response handler script on client peer interprets the response received from the server peer and activates appropriate scripts. The scripts, data structure and payload for each type of API action may be replicated to each device in a peer pair via the API mechanism itself for unlimited extensibility.

Therefore, unlimited possible action payloads can be carried via inner payloads and processed through the NAPIM while the general NAPIM system utilizes common outer framework for payload structure, senders, listeners, handlers and other elements of the API transport.

FIG. 1 shows a flow diagram of how an application program interface works. FIG. 1 describes the automated process flow of an Application Programming Interface (API) request-response automated information exchange transaction between two devices. As shown in FIG. 1, there is a pair of peer devices D-01 and D-02. The Peer Origin D-01 is a host client which is the source of the API call. At step 1, the Peer Origin D-01 generates a API request with a payload to send as a REQUEST 102. At step 2, the REQUEST 102 is received by the listening host server Peer Target D-02. At step 3, the API request received by the Peer Target D-02 is processed by D-02's API handler. Based on the processing of the API call, an action may be taken. At step 4, a response based on the processed API request is prepared and sent back as a RESPONSE 104. At step 5, the RESPONSE 104 is received by the Peer Origin D-01. At step 6, the RESPONSE 104 is processed by the Peer Origin D-01.

In some embodiments, there may be security layers added in the request and the response. The transport method may also be protected by certificate, protocol (e.g., https or http), or other methods. In some embodiments, both peer hosts D-01 and D-02 are able to prepare and send a structured data payload which can be interpreted, understood, and processed by the other peer.

Figure 2:
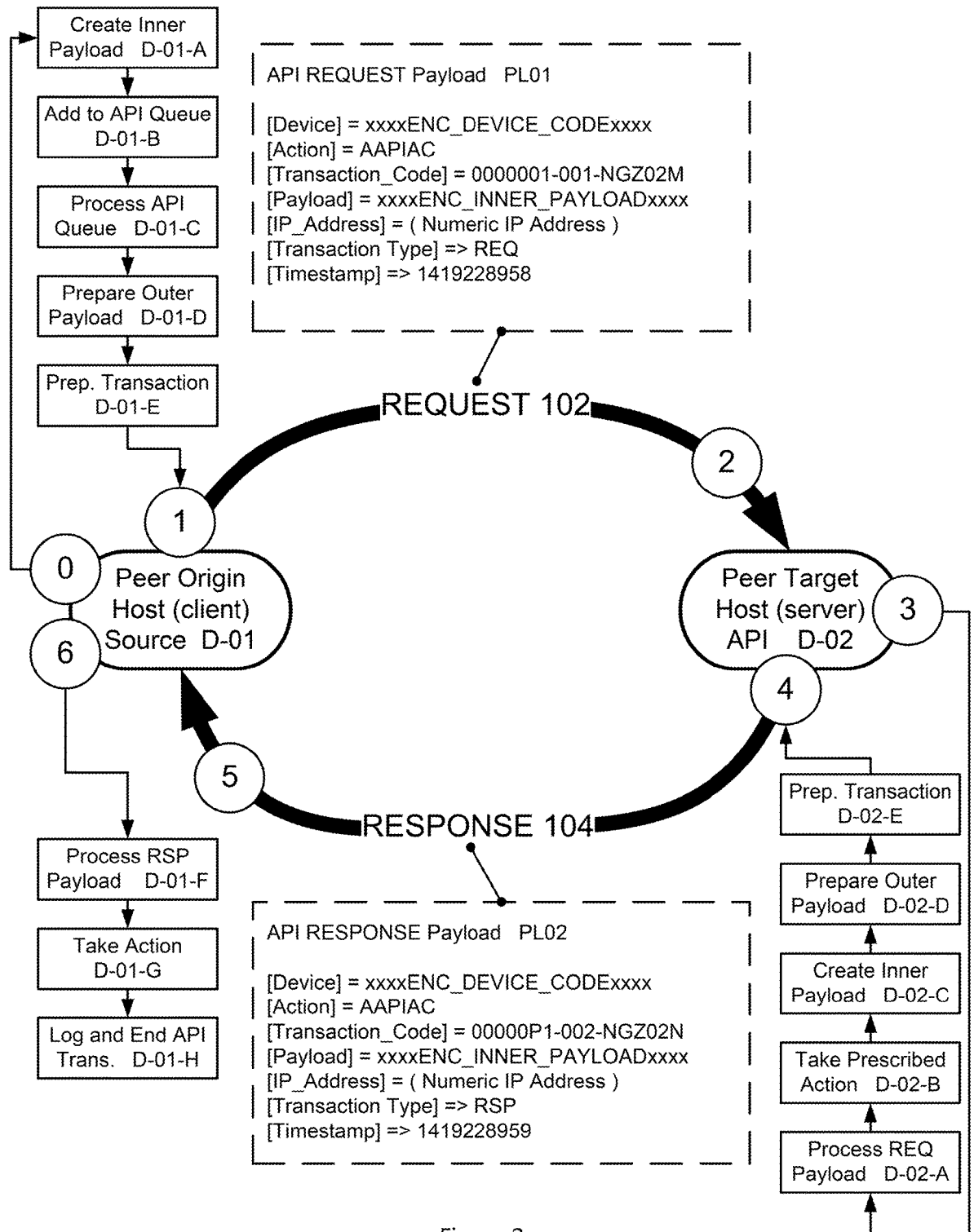
FIG. 2 shows a flow diagram illustrating the neutral application programming interface (API) mechanism carrying a data array inside an inner payload, in accordance with an embodiment of the present disclosure.

FIG. 2 shows a flow diagram illustrating the neutral application programming interface (API) mechanism carrying a data array as an inner payload inside an outer payload, in accordance with an embodiment of the present disclosure. FIG. 2 illustrates the neutrality of the API mechanism where all request and response outer payloads adhere to the same data structure pattern. In other words, all request and response outer payload adhere to a common definition, which has the same consistent structure, fields, etc. This "same-pattern" preparation, delivery and parsing framework allows for a very flexible, dynamic abstraction of unlimited API actions which can be carried by the mechanism. This approach may also offer the opportunity to secure the data payload wrapped in one or more layers of security. An added benefit is that the API itself becomes the delivery system for its own structural definitions and new functionality can be added to its actions matrix through the publishing of API actions and related scripts, data structure definition and other relevant information via the API itself.

A database for the API instance running on each peer device allows for tables to store an API_Queue, Peer Pairs data, API_Transactions, API_Actions_Index and other relevant information which the API module of each device of the peer pairing will utilize. Further details regarding the software stack in client, server and central server devices plus the integration of database backing and replication of data between databases will be discussed later in relation to FIG. 6. The database table names, fields and structures noted herein are examples and can be different. There also may be more or less tables to store API related data.

The requisite security is realized by protecting an inner payload through the encrypting of it and including the obfuscated payload as a data element of the outer payload.

FIG. 2 incorporates all the elements of FIG. 1. As shown in FIG. 2, an added starting point (step 0) at the Peer Origin Host (client) Source D-01 illustrates the trigger for the API transaction call. Step 0 may comprise sub-steps D-01-A to D-01-E. At step D-01-A, data is passed to a common class or other type of handler to create inner payload. At step D-01-B, the inner payload is added to a queue which may be in memory, saved to database, flat file or other mechanism. The queue step may be bypassed or set to send at a certain time. At step D-01-C, as a part of the heart beat functionality of the client device D-01 and depending on the priority flag of the API call in the queue, the payload in the queue can be processed immediately, processed at a specific time or deferred based on a factor such as load, queue length, network conditions or other factors. At step D-01-D, after an item is processed from the queue, an outer payload is prepared. At step D-01-E, relevant transaction data are generated for a specific, single use API call. The encryption can be unique via rotating calculated key based on time, peers in pairing, action, and other factors. When the API REQUEST payload PL01 is ready to be sent at step 1, it is conveyed via the Neutral API mechanism to be received at step 2 by the Peer Target Host (server) API (D-02). As shown in FIG. 2, in some embodiments, the outer payload PL01 may include information regarding Device, Action, Transaction_Code, Payload, IP_Address, Transaction Type, and Timestamp. Timestamp may be the time when the request/payload is generated. Payload may specify an encrypted inner payload.

Upon receiving the API REQUEST payload PL01, at step 3, the Peer Target D-02 may parse and interpret the API REQUEST payload PL01. Step 3 may comprise sub-steps D-02A to D-02-D. At step D-02-A, in the processing of the API REQUEST payload PL01, there may be security and data integrity checks made and the payload may be decrypted to discover the contents of the inner payload. Further security and data integrity checks may be made comparing the inner and outer payloads. In some embodiments, the outer payload is parsed according to the "same-pattern" (i.e., common) structure of the outer payload. The information (e.g., name) of the action to be taken (e.g., AAPIAC) may be obtained. The inner payload may be parsed according to a definition of the action. For example, the inner payload may be parsed according to the definition of the action AAPIAC. In some embodiments, the definition of an action specifies the structure of the payload of the action. At step D-02-B, upon validation, the payload (e.g., inner payload) is passed to the corresponding script to take the prescribed action. In some embodiments, the action is processed by a script or some other handlers. At step D-02-C, upon completion of requested action, the inner payload for the response is created, and can include encryption of fields. At step D-02-D, the outer payload for the response is created. At step D-02-E, relevant transaction data are generated for RESPONSE 104. At this point, The API RESPONSE payload PL02 is generated.

In some embodiments, the differences between an API REQUEST payload and an API RESPONSE payload may include transaction type: REQ=request and RSP=response. In some embodiments, timestamps are created when the transaction is prepared at D-01-E and D-02-E. The differences may include different timestamps. Timestamps may be UNIX timestamps and processing time will differ between various actions. To keep the integrity of the system, all devices may automatically update their internal clocks on a regular basis to ensure synchronicity in order to avoid issues caused by time drift of clocks. The differences may include Device. For example, [Device] in the API REQUEST payload PL01 specifies the device code of Peer Origin D-01. And [Device] in the API RESPONSE payload PL02 specifies the device code of Peer Target D-02. The transaction code in the API REQUEST payload PL01 and the transaction code in the API RESPONSE payload PL02 may also be different. The IP Addresses may also be different.

The payloads may also be different. The response payload PL02 is more verbose because the [Payload] element of its data structure includes an encrypted block containing both the un-encrypted request payload PL01 and a response payload. This may allow Peer Origin D-01 to verify not only the integrity of the data structure of the response but also to give D-01 the ability to receive the inner, decrypted version of its original request for comparison and validation purposes. At step 6, Peer Origin D-01 may parse and interpret API response payload PL02. Step 6 may comprise three sub-steps. At step D-01-F, the response payload are processed and validated. At step D-01-G, upon successful validation, the inner decrypted response payload of PL02 may be sent to the appropriate action response handler script on the Peer Origin D-01. At step D-01-H, to complete the API transaction, logging and ending of the API is performed. If there is a [Callback] array attached to the inner decrypted response, then that will be the trigger for one or more new API transaction calls, which starts at step 0. All new callback API calls may be independently handled and not dependent or reliant on past calls as D-01-H is the terminal end point of an API transaction call.

Figure 3:
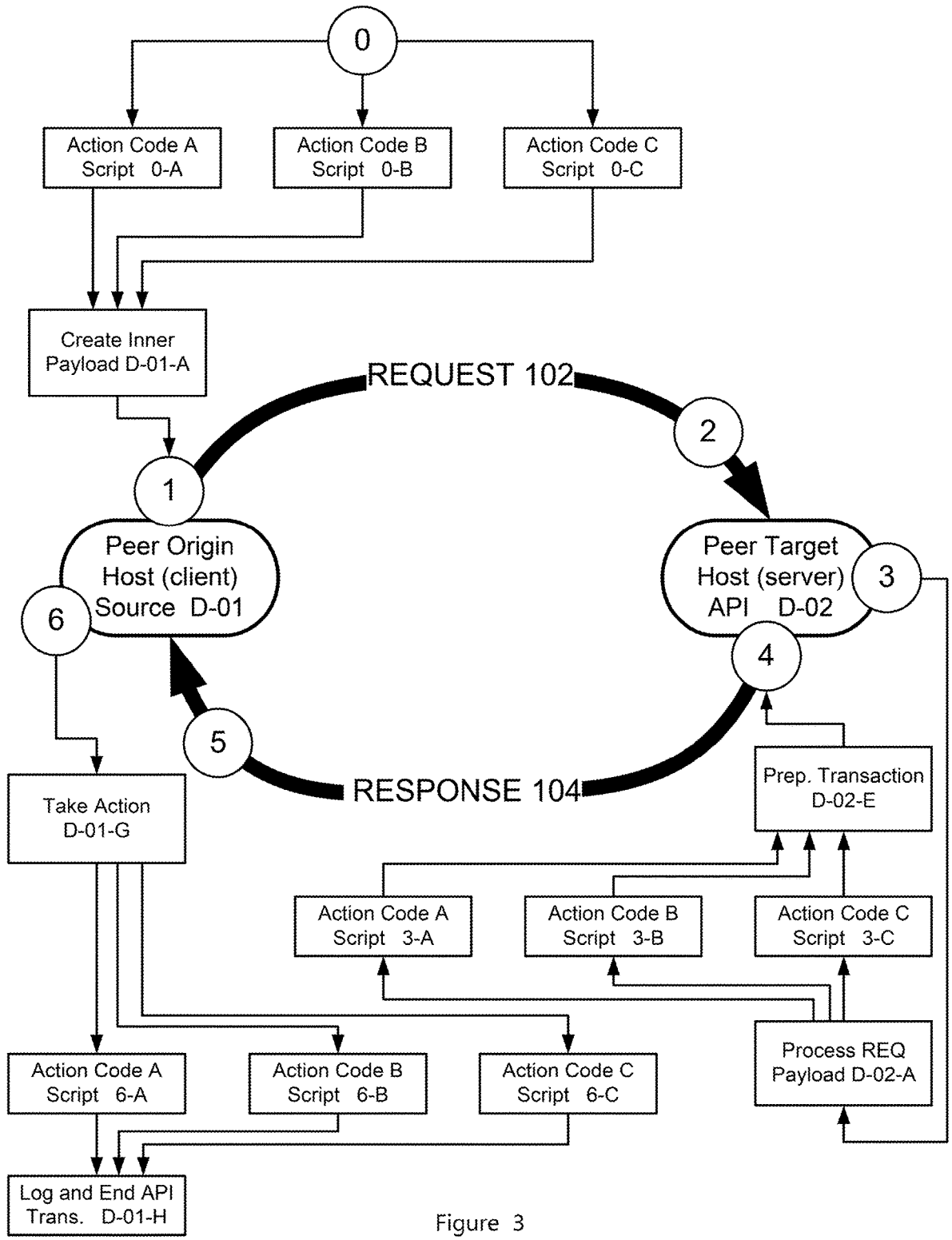
FIG. 3 shows a flow diagram illustrating the neutrality of the API mechanism regardless of the payloads, in accordance with an embodiment of the present disclosure.

In some embodiments, an inner payload may comprise an array, a key-value pair, an object, a data file, and/or a binary file FIG. 3 shows a flow diagram illustrating the neutrality of the API mechanism regardless of the payloads, in accordance with an embodiment of the present disclosure. FIG. 3 includes steps 0 to 6, request 102, response 104, peer origin D-01 and peer target D-02.

Step 0 for the API call is the starting point. Based on the action to be taken, a specific action script could be a standalone file, a daemon, a class, a function, an imbedded block of code or other mechanism to prepare an inner payload data structure for a specific API action to be taken.

For example, a script for Action Code A 0-A prepares its payload and creates inner payload of the request at step D-01-A. For simplicity sake in this example, the steps D-01-B through D-01-E noted in FIG. 2 are left out but the reader should see them as taken place between step D-01-A and step 1. At step 1, the request payload is sent to peer target D-02 in similar fashion to FIG. 1 and FIG. 2.

At step 2, the request payload is received by peer target D-02. The request payload is parsed and processed at step D-02-A. Upon successful decryption of inner payload and passing security and data integrity validation, and based on the action code specified by the trigger, in this example (Action Code A), the data structure in the inner payload will be sent to Action Code A Script 3-A. Upon successful handling, processing and generation of a response inner payload data structure, at step D-02-E, relevant transaction data are generated for RESPONSE 104. The response payload is sent to peer origin D-02 at step 4, and received by peer target D-01 at step 5.

As described above, at step D-01-G, upon successful validation, the inner decrypted response payload may be sent to the appropriate action response handler script on the peer origin D-01. As shown in FIG. 3, based on the Action Code, the inner decrypted response payload is sent to the relevant Action Code Script. In this example stream, Action Code A is processed by Action Code A Script 6-A. This example API call transaction will terminate at D-01-H.

Similarly, if Action B is included in the payload, Action B will go from 0 to 0-B then D-01-A to 1 to 2 to 3 to D-02-A and the request will be processed by 3-B to D-02-E to 4 to 5 to 6 to D-01-G to 6-B and terminate at D-01-H.

Similarly, if Action C is included in the payload, Action C will go from 0 to 0-C then D-01-A to 1 to 2 to 3 to D-02-A and the request will be processed by 3-C to D-02-E to 4 to 5 to 6 to D-01-G to 6-C and terminate at D-01-H.

Figure 4:
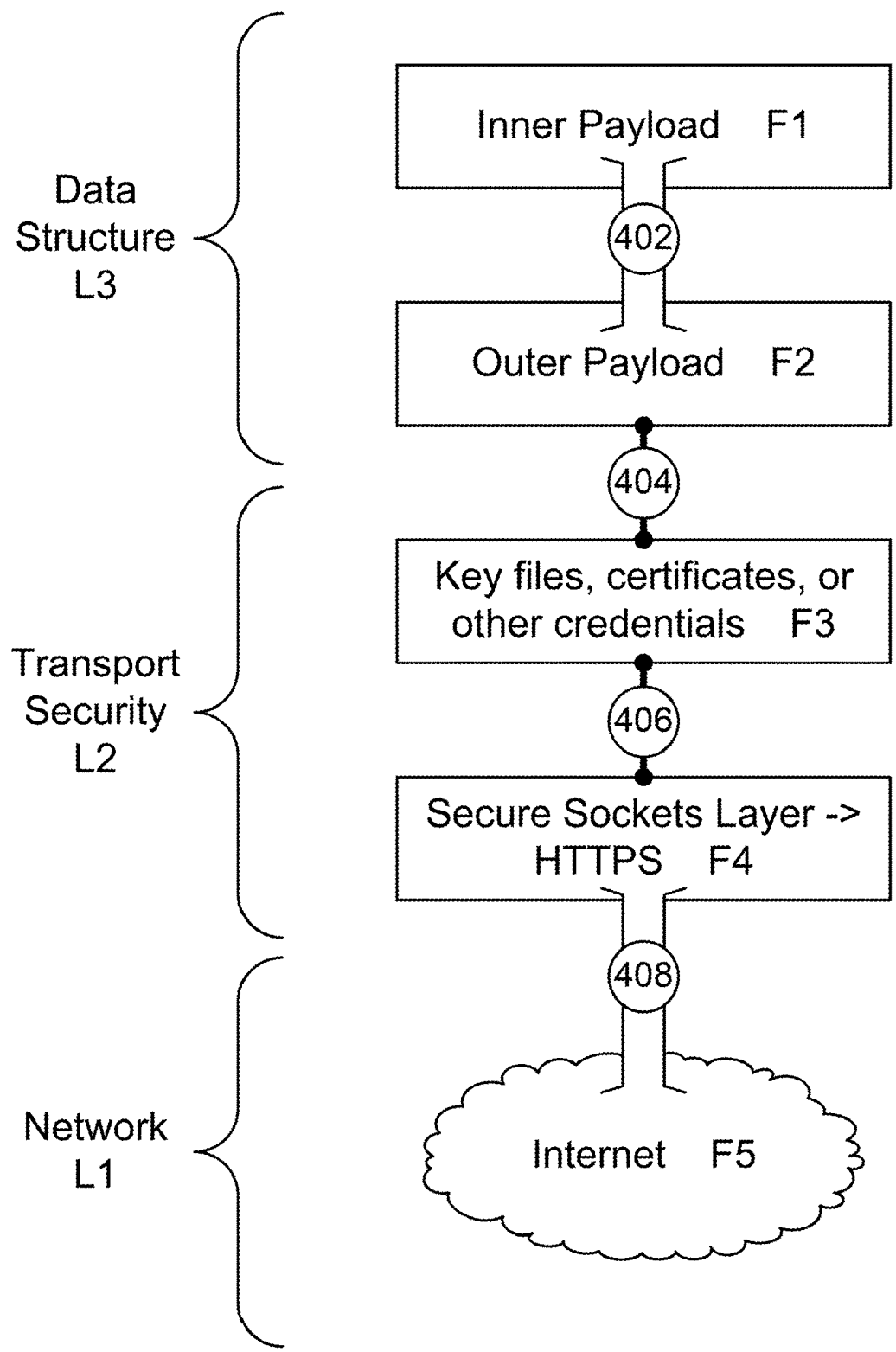
FIG. 4 shows a block diagram illustrating the security aspects of the neutral API mechanism, in accordance with an embodiment of the present disclosure.

FIG. 4 shows a block diagram illustrating the security aspects of the neutral API mechanism, in accordance with an embodiment of the present disclosure.

In many ways, the Neutral API Mechanism may operate like a traditional client-server request-response API call by utilizing key files, certificates or other credentials (i.e., F3) to encrypt the packets via Secure Sockets Layer (SSL) for HTTPS (i.e., F4) transport over 408 the Internet F5. The Transport Security L2 (including 406 and 404) and Network L1 elements are similar to other traditional post-API-calls made to dedicated scripts.

The Neutral API Mechanism goes steps further with additional protections of the Data Structure L3.

The Outer Payload has certain data elements to direct it to target device and to carry an encrypted inner payload to be handled by the appropriate Action Code Script for parsing and processing. The encryption 402 between inner payload F1 and outer payload F2 secures the data payload in the event that the HTTPS encryption is compromised during the transport 408 through the internet F5.

The encryption and decryption 402 between inner and outer payloads may utilize specific peer pair info and other factors such as key adjustors unique to the relationship between client and server devices. Another element of security is for the data structure for specified action to adhere to an expected pattern. In some embodiments, the encryption of the payload may be based on a calculated rotated key utilizing various factors including time stamp, action type, peer pairs (and their associated keys and keys related to their relationship).

The security info, keys, key adjustors, certificates, and other information related to securing API transactions between peer pairs may be dynamically updatable via API calls either between devices in the peer pair or for each device to receive this information via API calls to a central control server (SRV_CNTRL), back channel mechanism or other method.

There are also anti-replay features embedded into the framework based on timestamp, transaction code, and other factors to ensure that each API call is processed only once. This is to counter either man-in-the-middle malicious attacks or to abate the negative effects of device malfunction. In some embodiments, the anti-replay is based on a threshold based on network latency. For example, if the network latency (e.g., expected latency in a network) between an originating device (e.g., peer origin D-01) and a destination device (peer target D-02) is only 1 second and if the destination device receives a request more than 1 second later after the request is sent by the originating device (for example, based on the timestamp in the request payload), the designation device may choose not to process the request.

FIG. 5A shows a diagram illustrating an example request payload array, in accordance with an embodiment of the present disclosure.

FIGS. 5A and 5B illustrate the inner payload which is encrypted and then carried in the outer payload. FIGS. 5A and 5B are based on FIG. 2 and repeats many elements described in that example embodiment. FIG. 2 has been split into counterpart drawings defined as FIG. 5A and FIG. 5B. The example embodiment FIG. 5A illustrates the request portion of the API call and FIG. 5B illustrates the response portion.

The following elements of example embodiment portion FIG. 5A are equivalent to those described in FIG. 2 such as devices D-01 and D-02 and the communication path between them 0 to 1 including intermediary steps D-01-A through D-01-E to 1 to 2 to 3. The payload PL01 in FIG. 2 is further illustrated with PL01-OUTER and PL01-INNER in this example embodiment.

Upon the decryption of request outer payload PL01-OUTER by peer target D-02, the request inner payload PL01-INNER is discovered. The data structure of PL01-INNER may be a multi-dimensional array or other type of data structure. The [WRAPPER] and [Meta_Data] and [Payload] and [Callback] elements are presented for illustrative purposes and may contain same or different sub-fields, nested arrays, links to files, globs of file data or other information appropriate to the action to be undertaken by the server device of the peer pair of the API transaction call.

FIG. 5B shows a diagram illustrating an example response payload array, in accordance with an embodiment of the present disclosure.

The following elements of example embodiment portion FIG. 5B are equivalent to those described in FIG. 2 such as devices D-01 and D-02 and the communication path between them from 3 to 4 including intermediary steps D-02-A through D-02-E to 4 to 5. The payload PL02 in FIG. 2 is further illustrated with PL02-OUTER and PL02-INNER in this example embodiment.

Upon the decryption of response outer payload PL02-OUTER by peer origin D-01, the response inner payload PL02-INNER is discovered. The data structure of PL02-INNER may be similar to PL01-INNER. However as it is the response, its main payload is the processed result of the action taken by the server. When sending the response back, the original request (e.g., a portion of the original request or the original request) may be included as an element of the data structure. The [WRAPPER] and [Meta_Data] and [Payload] and [Callback] elements in PL02-INNER are presented for illustrative purposes and may contain same or different sub-fields, nested arrays, links to files, globs of file data or other information appropriate to the action to be undertaken by the client device of the peer pair of the API transaction call.

Figure 6:
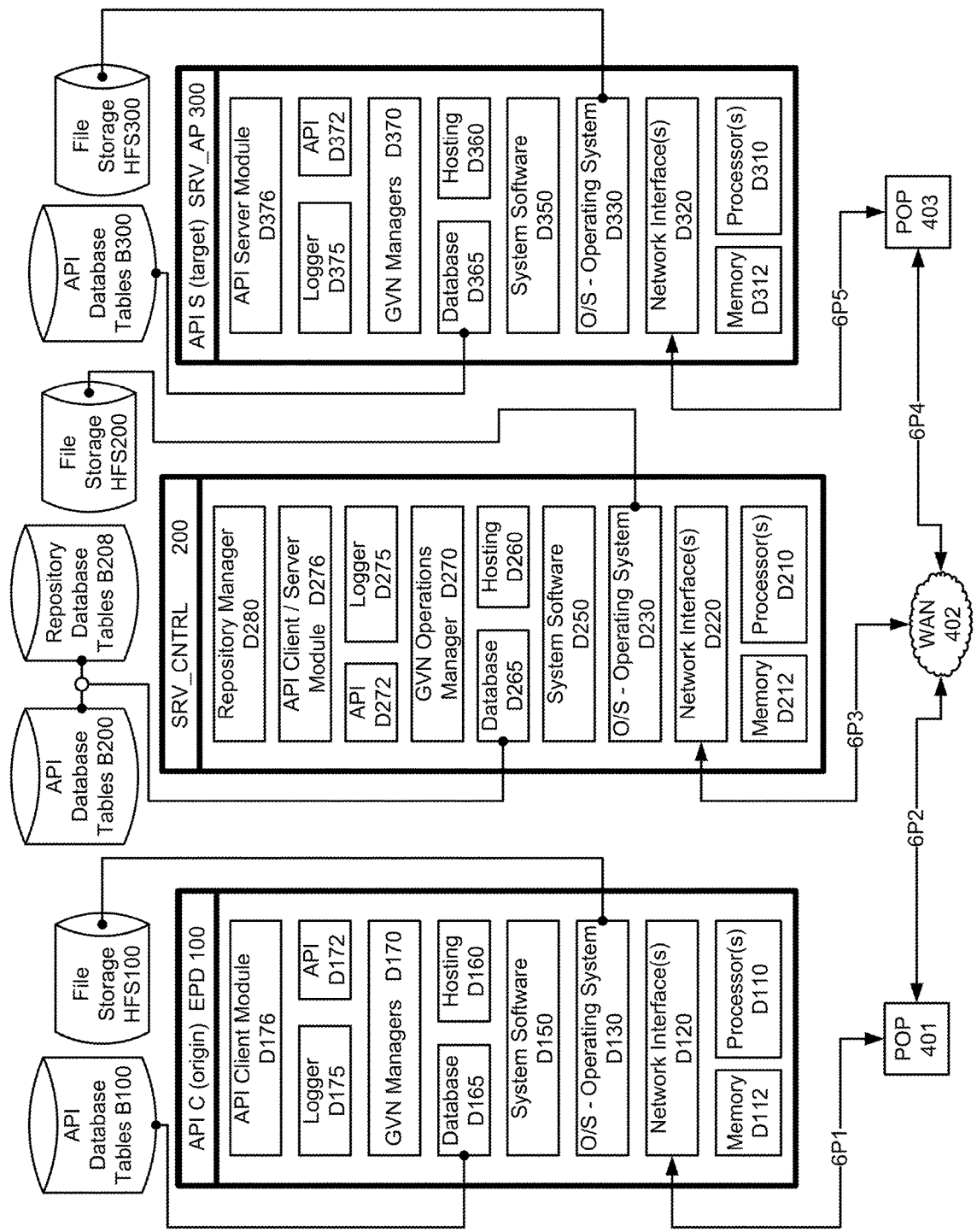
FIG. 6 shows a block diagram illustrating neutral API mechanism device peers and coordination with the central control server (SRV_CNTRL), in accordance with an embodiment of the present disclosure.

FIG. 6 shows a block diagram illustrating neutral API mechanism device peers and coordination with the central control server (SRV_CNTRL), in accordance with an embodiment of the present disclosure. This example embodiment illustrates a logical view of the software architecture of three types of network devices working together as a part of a Neutral API Mechanism (NAPIM) within a Global Virtual Network (GVN) in accordance with certain embodiments. As shown, the software and hardware can be distributed within the network devices and across different circuit boards, processors, network interface cards, and memory.

One described network device is an API Client (origin) device 100. Another described network device is central server SRV_CNTRL 200 and the third device is an API Server (target) device 300.

The client device 100 may be connected to the server device 300 via tunnel described by communication path 6P1 to a point of presence (POP) 401 through 6P2 to a WAN 402 to communication path 6P4 to POP 403 to communication path 6P5. The path transiting WAN 402 could also be over the regular internet.

Each device client 100 and server 300 can also connect to the SRV_CNTRL device 200 via 6P3.

The software architecture of client 100 and server 300 may be very similar with the differentiation by role of each device in that transaction. The client 100 has an API Client Module D176 and the server 300 has an API Server Module D376. For the simplicity of explaining this example embodiment only one module has been expressed D176 on the client 100 and D376 on the server 300. In fact, devices may have a combined client and server role depending on its function within the GVN. The SRV_CNTRL does in fact possess this quality with its API Client/Server Module D276.

The lowest level of each device are the Memory D112/D212/D312 and Processors D110/D210/D310, and the network interfaces D120/D220/D320. All of these may be on the hardware level. The operating system (O/S) D130/D230/D330 can be a LINUX system or equivalent system such as Debian or other. This includes packages and configuration for routing, hosting, communications and other system level operations.

On top of the operating system, a system software layer D150/D250/D350 of the Global Virtual Network's (GVN's) operating systems. There are custom commands, system modules and other constituent parts operating here, as well as other components of the GVN. Each type of device of the GVN may have some or all of these portions of the system software layer depending on their role.

Database modules D165/D265/D365 and Hosting Modules D160/D260/D360 are configured in this example embodiment for the listening, sending, processing, storage, retrieval and other related foundation level operations of the GVN's NAPIM.

GVN Managers described in D170/D270/D370 offer dependency functionality to the NAPIM. The Logger described by D175/D275/D375 in this example embodiment imbues the functionality of recording API actions and transactions. The Logger also has other roles and processes for other aspects of the GVN operations.

The API D172/D272/D372 describes the NAPIM's engine. On the API Client 100, on top of the API engine D172, the API Client Module D176 prepares API requests and also handles received API responses.

On the API Server 300, on top of the API engine D372, the API Server Module D376 listens for incoming API calls to be processed by D372 and prepares response to be sent back via D372.

On the SRV_CNTRL 200, there is an additional layer for the Repository Manager D280 which handles the coordination of the sharing of peer pair info, credentials and other information to individual devices connecting to other peers via the API mechanism of the GVN.

Operating systems D150/D250/D350 may have file storage HFS100/HFS200/HFS300.

The database structure of the API-related database tables B100/B200/B300 are equivalent on each of the API client 100, central server 200 and API server 300.

On SRV_CNTRL 200, the Repository Database B208 is where unique peer information is stored for all peers and this information can be used by the Repository Manager D280 to communicate API credentials or other info for a client or server within a peer pair to receive information relative to it or to its peer.

Stored within each device API database B100/B200/B300 are peer info about the device itself and its peer pair partners, transaction lists and queue data.

There are other uses for described methods and databases beyond API but this example embodiment only covers the aspects of API functionality of concerned devices.

Figure 7:
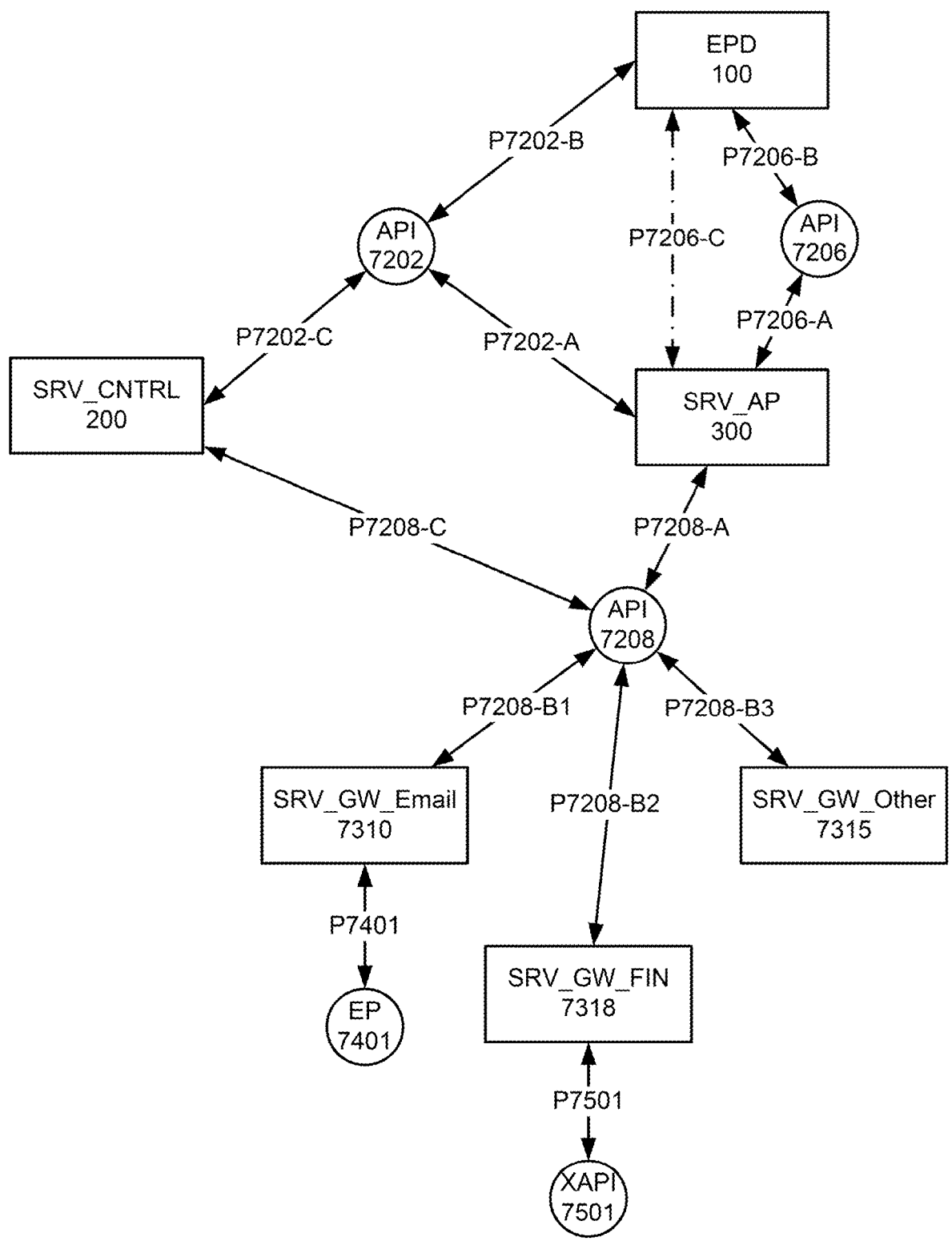
FIG. 7 shows a diagram illustrating automated device collaboration, in accordance with an embodiment of the present disclosure.

FIG. 7 shows a diagram illustrating automated device collaboration, in accordance with an embodiment of the present disclosure.

This example embodiment describes API call groups 7202, 7206 and 7208 between different types of devices within a Global Virtual Network (GVN). Each API call is circular in nature with a request sent from a client to a server with a response sent back. In most cases, the client can be one or the other end of a peer pair as long as the other peer has listening enabled for it to act as a server.

API call group 7202 represents calls from the Central Control Server (SRV_CNTRL) 200 via path P7202-C to End Point Device (EPD) 100 via P7202-B and Access Point Server (SRV_AP) 300 via P7202-A. This type of communication can exchange information between the repository database and file store on the SRV_CNTRL 200 and the EPD 100 and SRV_AP 300 about tunnel info, logging info, billing info, device peer pair data, and other forms of relevant information.

Between the EPD 100 and SRV_AP 300 are two types of communication path. The direct tunnel is where Third Layer traffic, information and binary files can be pushed as data packets via path P7206-C. There also exists an API call framework between EPD 100 and SRV_AP 300 via P7206-B to API 7206 to P7206-A.

Direct connect between EPD 100 and SRV_AP 300 via API 7206 can be for information sharing, collaboration and verification and, other information. For example, an attempt to restart a tunnel can usually be initiated by one side with the other side automatically responding and rebuilding it. However, in the case where a tunnel is stuck and cannot be rebuilt, the API can be used to send commands to try to force a tunnel restart on both ends and if still unsuccessful can share information between devices. This information may trigger a need to use new tunnel information to build a different tunnel between the two devices, or to have both devices query SVR_CNTRL 200 to obtain fresh tunnel building info. Having a communication path between them via API 7206 is therefore extremely useful.

API call group 7208 represents calls from the SRV_CNTRL 200 and internal backend infrastructure devices and other infrastructure supporting devices of the GVN via path P7208-C. For simplicity sake of the illustration, some gateway devices are illustrated in this example embodiment and there are other types of infrastructure devices in a GVN not illustrated here which could connect via this path to the SRV_CNTRL.

SRV_GW_Email 7310 represents an email server and is linked to SRV_CNTRL 200 via P7200-B1 to API 7208 to P7208-C. The email can be sent and received via Email Network Access Point (NAP) 7401 via P7401. A dedicated email server allows other devices to be focused in their functionality and also offers simplified administration as it is the only device type that needs to be maintained with respect to email server administration.

SRV_GW_FIN 7318 represents a financial gateway server through which credit card and other financial related transactions could be made to third parties via External API 7501 NAP via P501. Like the example of the SRV_GW_Email 7310, a single focused device type role allows for other devices to focus on their core functionality and presents a simplified administration with only SRV_GW_FIN 7318 servers requiring extra administration to protect financial transactions with third parties.

SRV_GW_Other 7315 represents other types of gateways between the GVN and other services on the internet. Communications between these types of gateway servers and SRV_CNTRL 20 is via P7208-B3 to API 7208 to P7208-C.

A secondary API path between SRV_AP 300 and SRV_CNTRL 200 is via P7208-A to API 7208 to P7208-C and exists for redundancy purposes and infrastructure related communication between this peer pair.

Another group of calls from SRV_AP servers allow a path from SRV_AP 300 to SRV_GW_Email 7310 via path P7208-A to API 7208 to P7208-B1, and to SRV_GW_FIN 7318 via P7208-A to API 7208 to P7208-B2, and to SRV_GW_Other 7315 via P7208-A to API 7208 to P7208-B3. These can be for API calls for data exchange directly from SRV_AP 300 to those devices.

The API calls which transit via P7208-A can also represent relayed API calls from other devices via the SRV_AP 300 such as from an EPD 100 to SRV_GW_FIN 7318 via path P7206-B to API 7206 to P7206-A to SRV_AP 300 to P7208-A to API 7208 to P7208-B2 where the flow of the API call through SRV_AP 300 is only another hop in the chain with client being one end EPD 100 and server being the other end SRV_GW_FIN 7318.

API calls and other types of information exchange are essential to the operations of devices in the GVN. In some embodiments, types of Automated Infrastructure Operations may include: keeping Device operating systems configuration up to date; updating software packages of the O/S and modules from reliable sources to repository which can house update software for ease and predictability of patching, updating and new installs; deploying new global virtual network software modules and keeping installed modules up to date; controlled replication of the GVN database(s); keeping the API actions library up-to-date; and more.

On each device, there may be Daemons and Heartbeat Functionality where automation and device to device interaction is required for: keeping daemons running (e.g., services up, queues up and keeping them unclogged, heartbeat functions, logging functions), connectivity and construct structure (e.g., virtual interfaces, tunnels, multiple Tunnels, routes, server availability, geographic destination, DNS, caches and chained caches functioning properly).

The most up to date information is required for tunnel building and this information needs to be shared between client and server or tunnels will not be able to be built.

There exists a need for testing and diagnostics with the reporting of results data to be analyzed centrally in order to have visibility of the overall operations of the GVN. Testing and diagnostics can include: first layer conditions; connectivity of tunnels; best route from point to point on the internet; Advanced Smart Routing (ASR) for best route through the GVN; device operations, and more.

The neutral API mechanism disclosed herein may be utilized to convey information about itself including but not limited to: peer pair info; queue info; transaction logs; security/accounting/logging and other related data; API Actions, patterns, data structures, and related scripts to process actions either on client or server.

There may be a requirement to ensure that the framework for API and Hosting is up and running. Information regarding the state and configuration of Hosting Services can also be conveyed via the neutral API mechanism disclosed herein from a device to a central control server or other devices. The neutral API mechanism may be used to convey information including but not limited to: services up status; API module up and answerable; hosting of sites; databases running; secure—SSL certificates up to date for HTTPS communication; whether components of geographic destination are running.

There may exist other uses for information exchange via the neutral API mechanism related to Security/Firewall/Monitoring/Collaboration/Information Exchange, and other mission critical aspects of a network environment, such as a GVN.

The neutral API mechanism may be a powerful medium for information exchange and a holistic self-healing is therefore possible to be deployed across devices.

Figure 8:
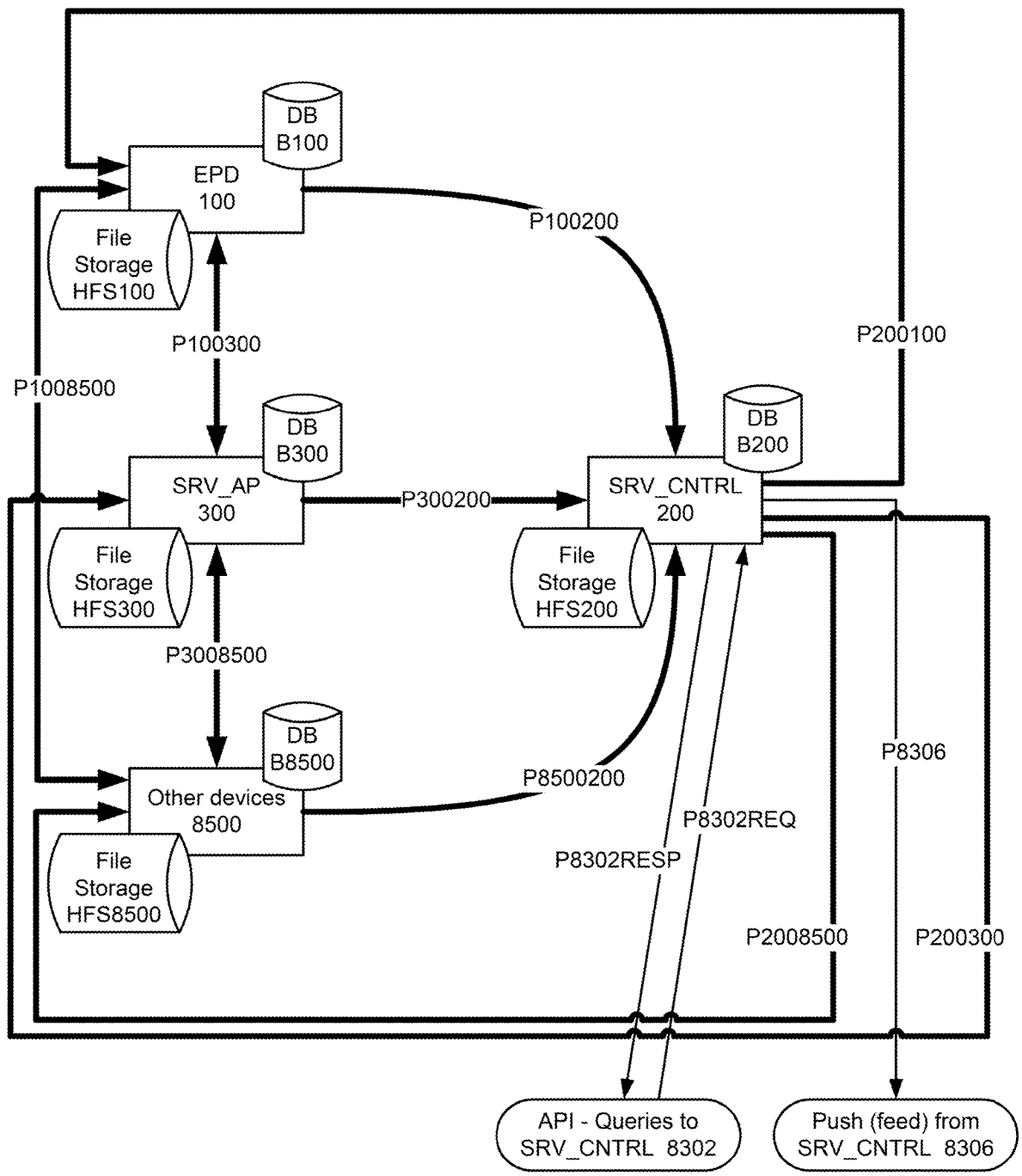
FIG. 8 shows a diagram illustrating information flow among devices and the central control server, in accordance with an embodiment of the present disclosure.

FIG. 8 shows a diagram illustrating information flow among devices and the central control server, in accordance with an embodiment of the present disclosure. This example embodiment describes the information flow between devices of a Global Virtual Network. A central repository comprised of database B200 and file storage HFS200 may be coupled to the central control server (SRV_CNTRL) 200. In some embodiments, the central repository may store API/action information. For example, the central repository may store a definition of the API/action, a script associated with the API/action that may be used to process the API/action. In some embodiments, the central repository may also store peer relationship of devices.

P100200/P100300/P1008500/P200100/P200300/ P2008500/P8500200/P3008500 represent communications between GVN devices which have a peer-pair and therefore privileged relationship with each other. EPD 100/SRV_AP 300/Other Device 8500 may be coupled with File Storage HFS100/HFS300/HFS8500 and database B100/B300/B8500.

There is circular pattern of peer-pair communication illustrated from SRV_CNTRL 200 to EPD 100 via P200100, to SRV_AP 300 via P200300, or to other devices 8500 via P2008500. The EPD 100 communicates with SRV_CNTRL 200 via P100200, SRV_AP 300 via P300200, and other devices 8500 via P8500200.

In some instances, there may be a loop of information shared between devices such as in the case when an EPD 100 may request information via P100200 from SRV_CNTRL 200 which is sent back to EPD 100 via P200100.

In other instances, one device may report information relevant to other devices such as an SRV_AP 300 reporting via P300200 to SRV_CNTRL 200 which is then sends information via P200100 to EPDs 100, or via P2003001 to other devices 8500.

In yet other instances, a full loop may not be required such as the sending of log information from a device such as an EPD 100 to SRV_CNTRL 200 via P100200, there is no need to further forward this information onward. However, logging information may at a later time be moved from repository on SRV_CNTRL 200 to a long-term log storage server 8500 via P2008500.

Direct link P100300 is between devices EPD 100 and SRV_AP 300. Direct link P3008500 is from SRV_AP 300 to other devices 8500. Direct links involve communications between devices which do not need involvement of SRV_CNTRL.

The PUSH info 8306 from SRV_CNTRL 200 could be an RSS feed or other type of information publishing via P8306. The API-queries 8302 from SRV_CNTRL 200 could be either a traditional API transaction or RESTful API call with request made via P8302REQ and response received via P8302RESP. The PUSH 8306 and API-queries 8302 are presented to illustrate devices which do not share peer-pair relationships, action code or definition (e.g., action code and/or definition has not been obtained, action code and/or definition is obsolete), privileged status, and/or similar systems architecture with GVN devices.

Figure 9:
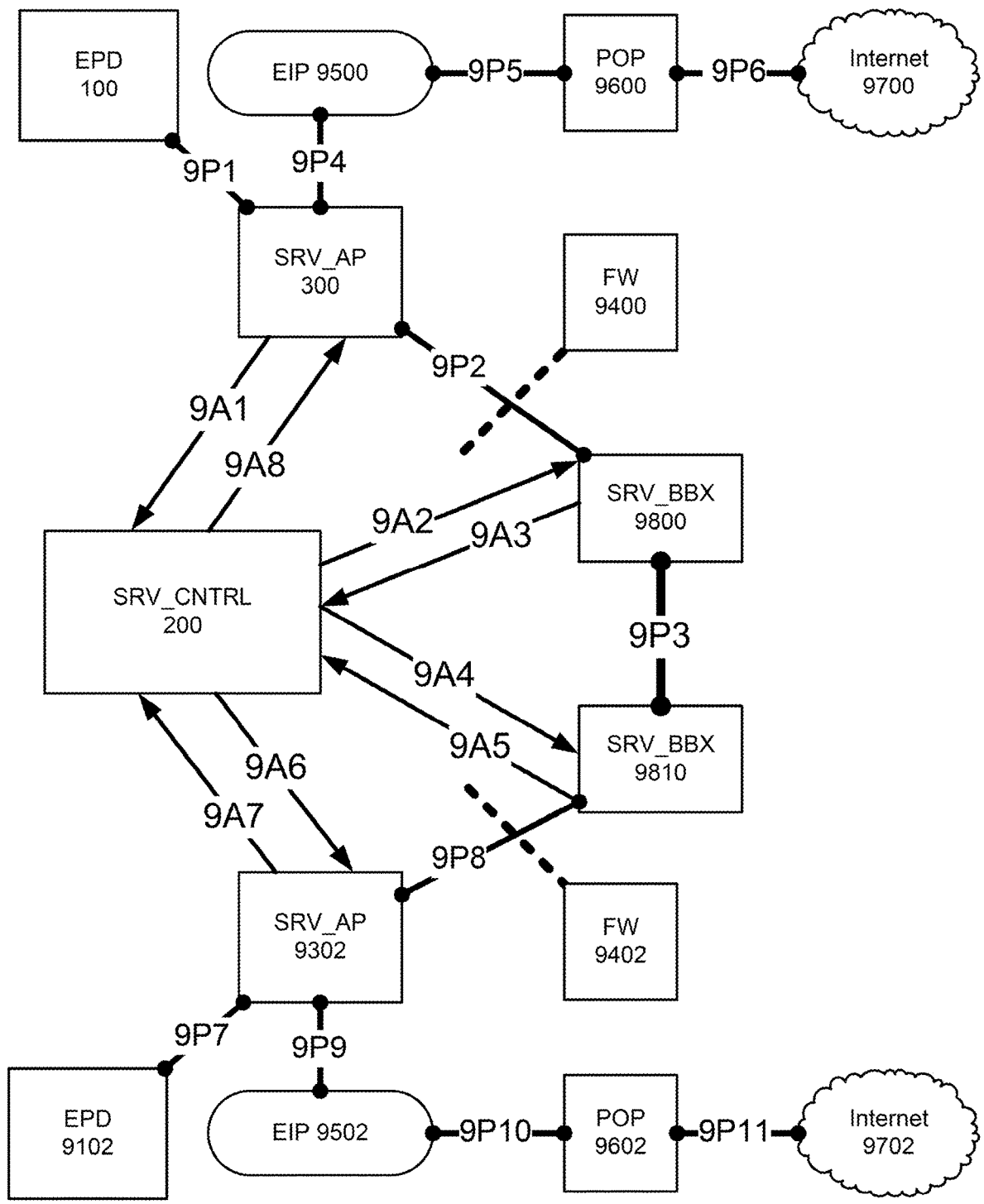
FIG. 9 shows a diagram illustrating backbone exchange server topology with security and an open-jaw API sequence, in accordance with an embodiment of the present disclosure.

FIG. 9 shows a diagram illustrating backbone exchange server (SRV_BBX) topology with security and an open-jaw API sequence, in accordance with an embodiment of the present disclosure. This example embodiment illustrates a series of API calls in a sequence within an example topology of devices within a typical global virtual network.

The first API call's request 9A1 from an access point server SRV_AP 300 to a central, control server SRV_CNTRL 200 is received, parsed and processed by SRV_CNTRL 200. It then triggers three more API calls all initiated by the SRV_CNTRL 200. Depending on the nature of the communications, these may be in sequence or can be simultaneously processed in parallel. These three additional calls of request 9A2 to a backbone exchange server SRV_BBX 9800 and response back 9A3, 9A4 request to another SRV_BBX 9810 and its response 9A5, and finally the third additional API call of request 9A6 to SRV_AP9302 and its response 9A7 back to SRV_CNTRL 200. When all three of these "internal" calls are completed, the final response 9A8 is returned back to SRV_AP 300, the device which initiated the first request of 9A1.

The API request 9A1 and response 9A8 can be characterized as an open-jaw call with a requirement that it may not complete until its internal calls 9A2-9A3 involving SRV_BBX 9800, 9A4-9A5 involving SRV_BBX 9810, and 9A6-9A7 involving SRV_AP 9302 are completed. This may be because information is required by SRV_AP 300 before it can take a subsequent action, for measuring and integration purposes, or other reason. For example, if an end-to-end tunnel should be built from SRV_AP 300 through SRV_BBX 9800 to SRV_BBX 9810 to an SRV_AP 9302 via paths 9P2 to 9P3 to 9P8, then all of those devices may need to be configured or triggered with the appropriate information and details. This type of API call can illustrate the request to set this up via 9A1 to SRV_CNTRL 200 which will then through the internal three API calls 9A2-9A3, 9A4-9A5, 9A6-A97, and the response 9A8 can include both configuration and settings information for SRV_AP 300 to utilize as well as an indication from SRV_CNTRL 200 that the other peer devices are set and ready.

FIG. 9 includes EIP 9500, via 9P5, POP 9600 and 9P6 to the open internet 9700. FIG. 9 includes EIP 9502, via 9P10, POP 9602 and 9P11 to/EIP 9502 the open internet 9702. 9P1 connects EPD 100 and SRV_AP 300. 9P4 connects SRV_AP 300 and EIP9500. 9P7 connects EPD 9102 and SRV_AP 9302. 9P9 connects SRV_AP and EIP9502.

In some embodiments, A2/A3 and A4/A5 and A6/A7 are independent API calls in series/sequences. In other embodiments, A2/A3 and A4/A5 and A6/A7 may be performed in parallel.

Security elements can be placed at various locations within the GVN topology illustrated herein. For example, firewalls FW 9400 and FW 9402 may be located along 9P2 and 9P8. firewalls FW 9400 and FW 9402 may protect SRV_BBX from internet threats ensuring secure backbone communications.

Information about secure egress and ingress points (EIP 9500 and 9502) may also be a factor in this kind of API exchange.

Figure 10:
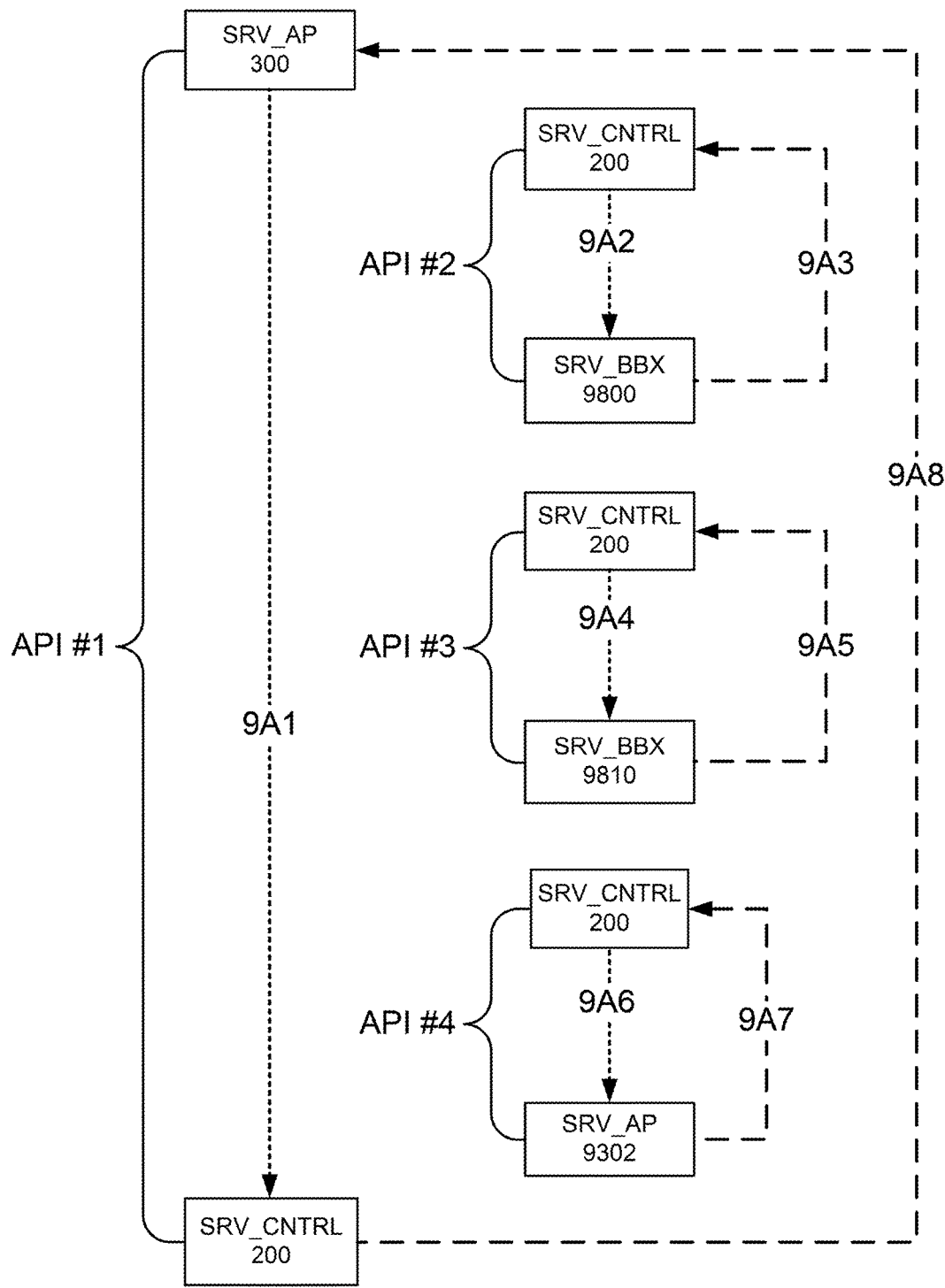
FIG. 10 shows a diagram illustrating open-jaw API call dependent on completion of internal API calls, in accordance with an embodiment of the present disclosure.

FIG. 10 shows a diagram illustrating open-jaw API call dependent on completion of internal API calls, in accordance with an embodiment of the present disclosure. This example embodiment is based on FIG. 9 and it may provide a different perspective of a set of API calls between GVN devices and an central, control server SRV_CNTRL 200 in a global virtual network GVN. Open-jaw call bookends API #1 (9A1-9A8) encapsulate and enclose internal API calls API #2 (9A2-9A3), API #3 (9A4-9A5), and API #4 (9A6-9A7).

Three internal round-trips are a dependency required for the exterior round-trip to be constituted as complete. RESP for API #1 (9A8) will wait for internal API calls API #2 (9A2-9A3), API #3 (9A4-9A5), API #4 (9A6-9A7) to be completed before evaluating results and sending back as RESP. Only then will the Open-Jaw API be able to close and response be sent.

This type of sequence is similar to a transaction set of SQL statements. All have to complete or none are able to complete. Roll back may therefore also be possible in the event of a failure of one of the calls.

Figure 11:
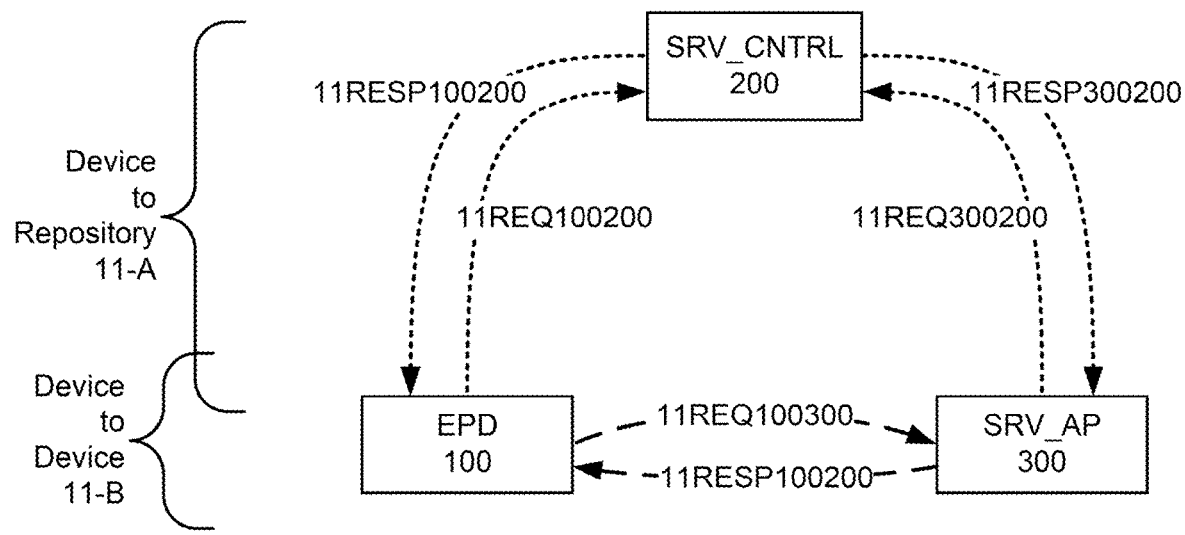
FIG. 11 shows a diagram illustrating request/response between peer devices and between a device and a central control server, in accordance with an embodiment of the present disclosure.

FIG. 11 shows a diagram illustrating request/response between peer devices and between a device and a central control server, in accordance with an embodiment of the present disclosure. This example embodiment illustrates two types of Device to Device info exchange via neutral API mechanism. More specifically, FIG. 11 illustrates the two types of neutral API mechanism request REQ/response RESP posting in a closed loop between known peer pairs via 11-A and 11-B.

In some embodiments, device to repository calls/information exchange 11-A are where SRV_CNTRL 200 can operate in repository mode for an API peer such as EPD 100 (through 11req100200/11resp100200) or SRV_AP 300 (through 11req300200/11resp300200) or other device to query: about the device itself (e.g., a list of the device's peer); about the device's peer pair partners (e.g., information of a peer device); about the API mechanism (e.g., actions—action codes, associated handlers, scripts, payload structures, etc., scripts associated with actions, definition/structure of an action)

In some embodiments, SRV_CNTRL 200 can operate in more than one mode, including repository (for peers to query), peer origin (client), peer target (server).

Device to Device information exchange 11-B (through 11req100300/11resp100200) can be for devices to talk directly with each other, when for example, a peer pair relationship exists between them, with each having information about the other which may include security keys, tunnel information, port and IP address info, and more.

All devices may act in the role of a client which can make requests, in the role of a server which will actively listen for requests and provide responses, or both according to dynamic settings for that peer.

Figure 12:
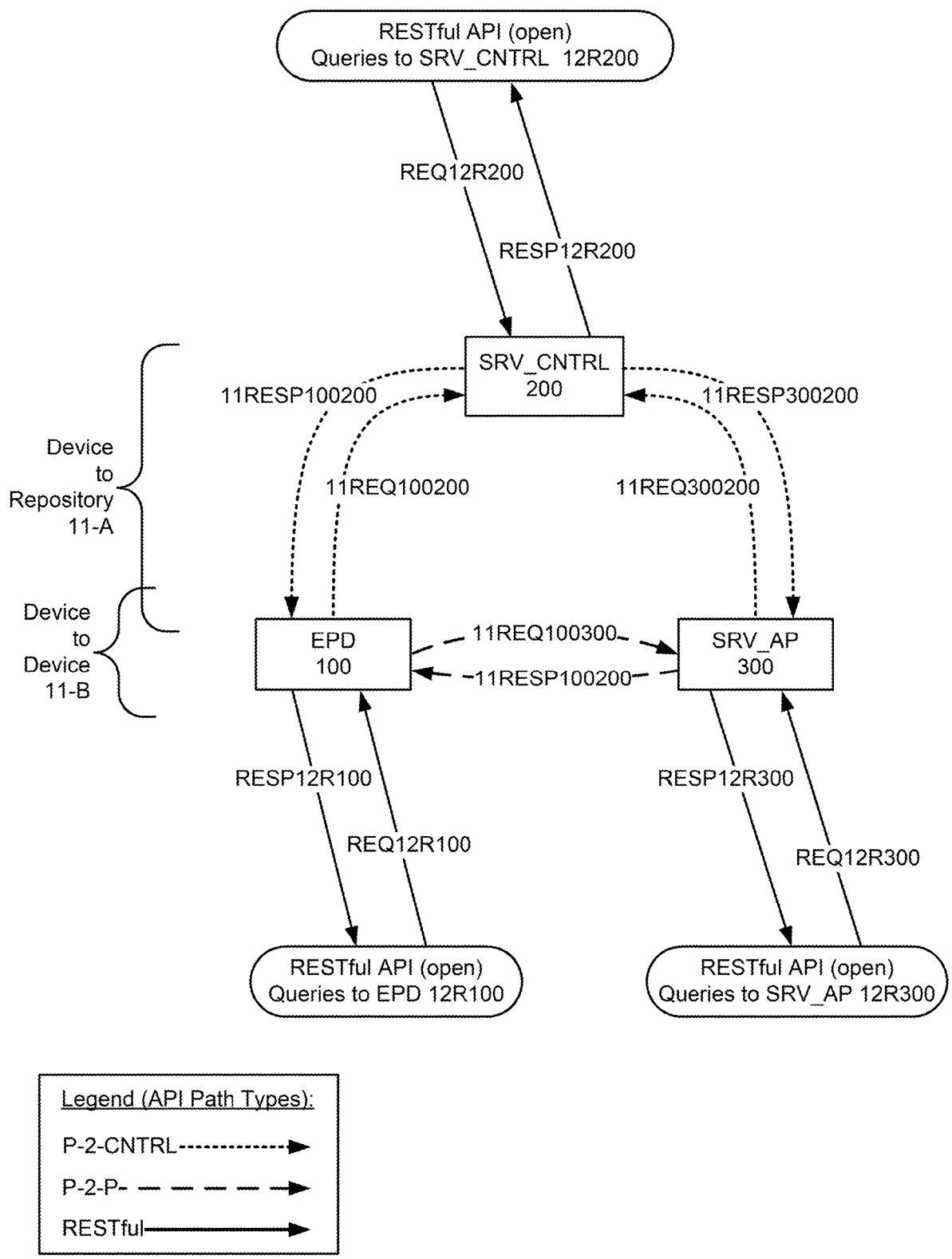
FIG. 12 shows a diagram illustrating closed and open loops, in accordance with an embodiment of the present disclosure.

FIG. 12 shows a diagram illustrating closed and open loops, in accordance with an embodiment of the present disclosure. This example embodiment is based on FIG. 11 and all elements of FIG. 11 are incorporated in FIG. 12. Different from closed loops illustrated in FIG. 11, FIG. 12 further illustrates RESTful URL posting in an open access framework (if dynamically allowed for that specific action) possibly to unknown peers via queries 12R200 to SRV_CNTRL 200 by request REQ12R200 and response RESP12R200. For example, the URL http://path.to/cntrl/time/check may be used by a device to receive the current time. The response is echoed back in the content served by that path and may be plain text, or an array, or key-value pairs, or an encapsulated array, or other representation of data.

Queries 12R100 (through REQ12R100 and corresponding RESP12R100) can illustrate RESTful URL calls to an EPD 100.

Queries 12R300 (through REQ12R300 and corresponding RESP12R300) can illustrate RESTful URL calls to an SRV_AP 300.

In some embodiments, the neutral API may have varying points of access, such as closed only, open via URL only, and both closed and open via URL.

In some embodiments, authentication may be required for open and/or closed neutral API mechanism. In other embodiments, authentication may not be required for open and/or closed neutral API mechanism.

In some embodiments, for the RESTful neutral API request/response, information may be served simply by opening that URL address, or a post of information may be required as a part of the request query before any information is served. For example, when making a time inquiry, only if a valid device ID of the requesting device is presented in a post of data to that URL will the SRV_CNTRL 200 then echo back the time. Otherwise an error may be thrown with a device unknown message or no message or content echoed back.

Figure 13:
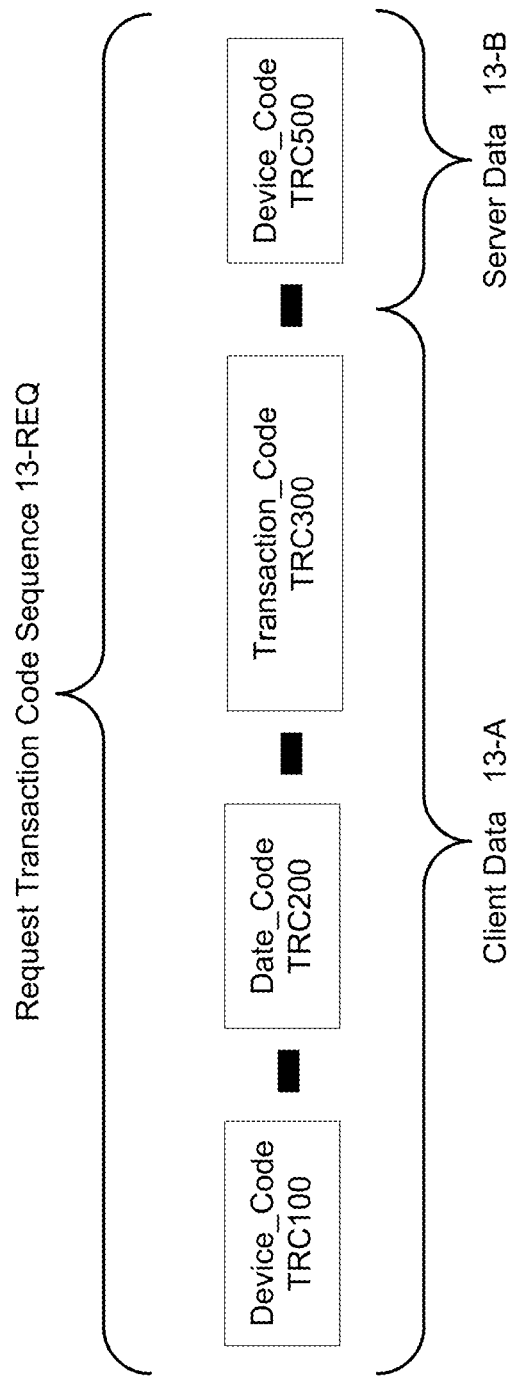
FIG. 13 shows a diagram illustrating example transaction codes in a request payload, in accordance with an embodiment of the present disclosure.

FIG. 13 shows a diagram illustrating example transaction codes in a request payload, in accordance with an embodiment of the present disclosure. This example embodiment illustrates example transaction code structure for requests made by client to server within a neutral API mechanism.

In some embodiments, client data 13-A comprises TRC100, TRC200, TRC300. Server data 13-B comprises TRC 500. Request transaction code sequence 13-REQ comprises 13-A and 13-B. The Device_Code TRC100 refers to the identifier for the client. Date_Code TRC200 can be calculated and may be based on the current UNIX timestamp (seconds since the UNIX time epoch or POSIX time). Transaction_Code TRC300 is a universal unique identifier (UUID) code based on a sequential record of API calls made by the client. The Device_Code TRC500 refers to the target/destination device UUID for the server. These values can be separated by hyphen "-", enclosed by square brackets or otherwise encapsulated to indicate their values. For all codes, the integer value of a device or time or transaction, its associated name, and or something like a base-36 conversion of the integer may be used, or some other representation of the data.

The request transaction code sequence 13-REQ may be used in whole or in part to identify peer pairs, to record the transaction number, to be utilized as part of the encryption/decryption process, or for other purposes.

Figure 14:
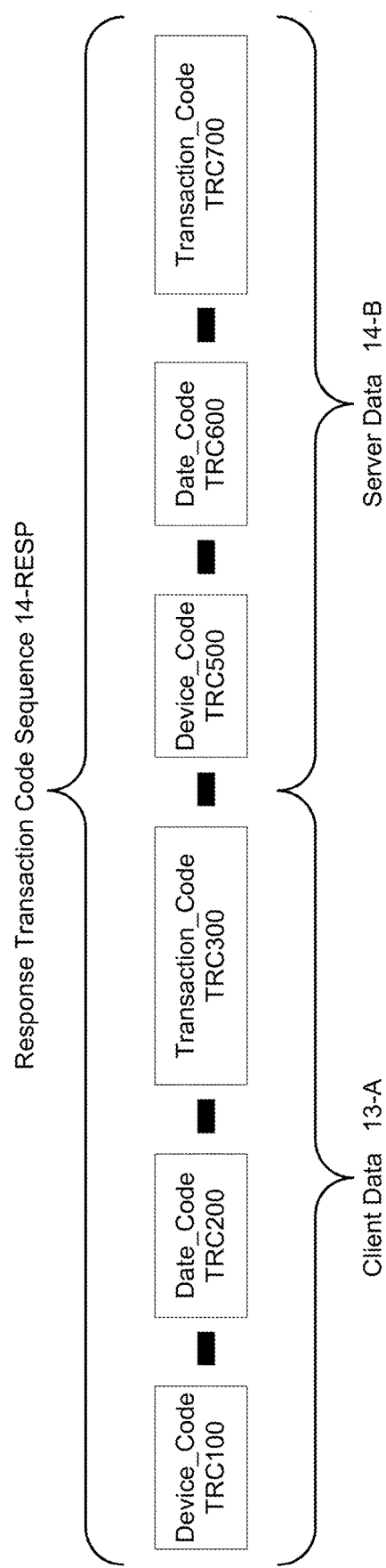
FIG. 14 shows a diagram illustrating example transaction codes in a response payload, in accordance with an embodiment of the present disclosure.

FIG. 14 shows a diagram illustrating example transaction codes in a response payload, in accordance with an embodiment of the present disclosure.

This example embodiment illustrates the transaction code structure for responses 14-RESP made by server back to client within a neutral API mechanism (NAPIM). It includes the base of the original request transaction code TRC100/TRC200/TRC300/TRC500 with the addition of appended date code TRC600 of the response plus the transaction code TRC700 universal unique identifier (UUID) code based on a sequential record of API calls answered by the peer (server) in the form of a 14-RESP. As shown in FIG. 14, response transaction code sequence 14-RESP comprises client data 13-A and server data 14-B. Client data 13-A comprises TRC100/TRC200/TRC300. Server data 14-B comprises TRC500/TRC600/TRC700.

Upon receipt by the client, the original TRC100, TRC200, TRC300 and TFC500 elements can be utilized by the client to confirm the veracity of the 14-RESP received back and can be used to match this information with the original request made. The TRC600 and TRC700 elements can also be logged by the client to record the response details for validation purposes.

The response transaction code sequence 14-RESP may be used in whole or in part to identify peer pairs, to record the transaction number, to be utilized as part of the encryption/decryption process, or for other purposes.

Figure 15:
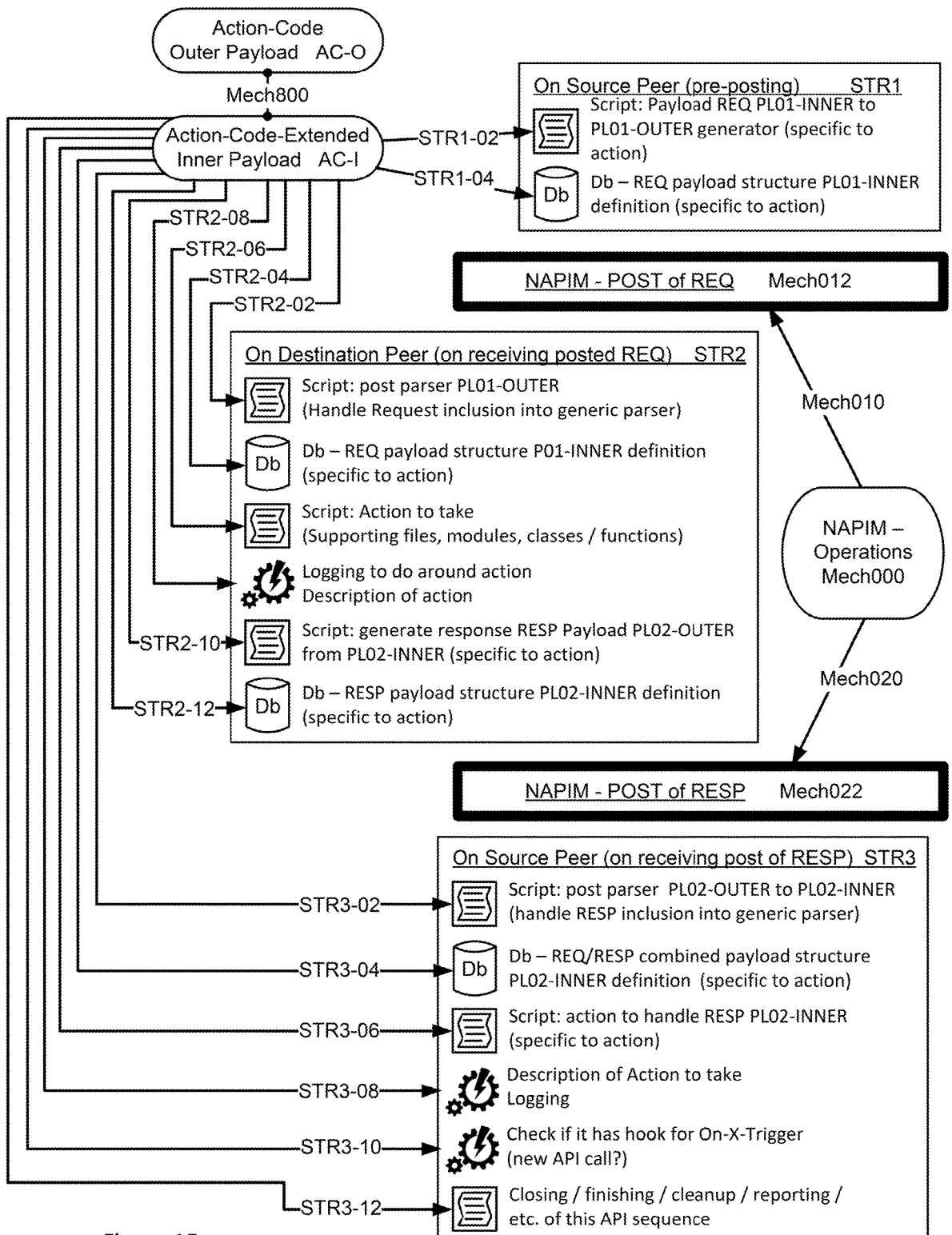
FIG. 15 shows a diagram illustrating example element mappings in a request/response payload, in a closed loop, in accordance with an embodiment of the present disclosure.

FIG. 15 shows a diagram illustrating example element mappings in a request/response payload, in a closed loop, in accordance with an embodiment of the present disclosure. This example embodiment illustrates the relationships between Action-Codes in outer payloads to Action-Code-Extended within internal payloads. It also maps some of the action code elements at various steps of the API sequence in a neutral API mechanism to Action-Code/Action-Code-Extended items. These scripts, database, and action items occur in three stages: on Source Peer (pre-posting) at stage STR1; On Destination Peer (on receiving posted REQ) at stage STR2; on Source Peer (on receiving post of returned RESP) at stage STR-3.

As shown in FIG. 15, in some embodiments, the API call's REQ Mech012/RESP Mech022 are made between known and related peers via secure framework of the neutral API mechanism. NAPIM-Operations Mech100 comprises Mech012 (via Mech010) and Mech022 (via Mech010).

Action-Code is the public short form which is included in the outer payload AC-O. Action-Code-Extended is internal, longer form which is securely enclosed in the encrypted Inner Payload AC-I. When decrypting the inner payload from the outer payload, these codes must be related to each other or if they do not, it may be an indicator of a man-in-the-middle (MITM) attack, replay attack, or other problem which will render the API call sequence invalid. This is both for operational and security reasons.

On Source Peer (pre-posting) at stage STR1, payload REQ generator script STR1-02—the structure of the internal payload AC-I for that specific action is prepared, populated and then encrypted into outer payload AC-O.

Also on Source Peer (pre-posting) at stage STR1, database stored payload definition STR1-04 for REQ payload structure definition—the definition of the internal payload AC-I structure for that specific action is defined herein associated to the specific action. This can aid in creating the payload, in checking its validity, in parsing it, and in other functionality of the API call.

At step NAPIM—POST of REQ Mech012, the posting of the REQ from client peer to listening server peer occurs.

On Destination Peer (on receiving posted REQ) at STR2: script STR2-02 as post parser parses PL-01-OUTER (Handle Request inclusion into generic parser)—the generic parser can include helper parsers based on the action code in the Outer Payload AC-O; database stored payload definition STR2-04 for PL01-INNER may be used to parse PL01-INNER; script STR2-06 handles action to take (In some embodiments, STR2-06 may retrieve or execute supporting files, supporting modules, and/or supporting classes/functions); Logger STR2-08 logs (logging to do around action and/or description of action and/or records actions); Script STR2-10 generates response RESP Payload PL02-OUTER from PL02-INNER (specific to action); database stored payload definition STR2-12 for RESP payload structure PL02-INNER definition (specific to action) may be used to create PL02-INNER.

At step NAPIM—POST of RESP Mech022, the posting of the RESP back from server peer to original client peer occurs.

On Source Peer (on receiving post of returned RESP) at stage STR3: Script STR3-02 as post parser parses PL02-OUTER and separates out PL02-INNER (handle RESP inclusion into generic parser); database stored REQ/RESP combined payload structure definition STR3-04 may be used to parse PL02-INNER; Script 3-06 handles action contained within RESP PL02-INNER; Logger STR3-08 performs logging; script 3-10 check if addition new API calls need to be triggered; script STR3-12 handles closing, finishing, cleaning up, reporting, etc. of this API sequence.

The above examples of scripts, database stored payload definitions, actions to take within a defined action code, other elements of the action-code within a neutral API mechanism can be utilized with other elements to execute a diverse range of many different actions through one neutral API mechanism framework.

Figure 16:
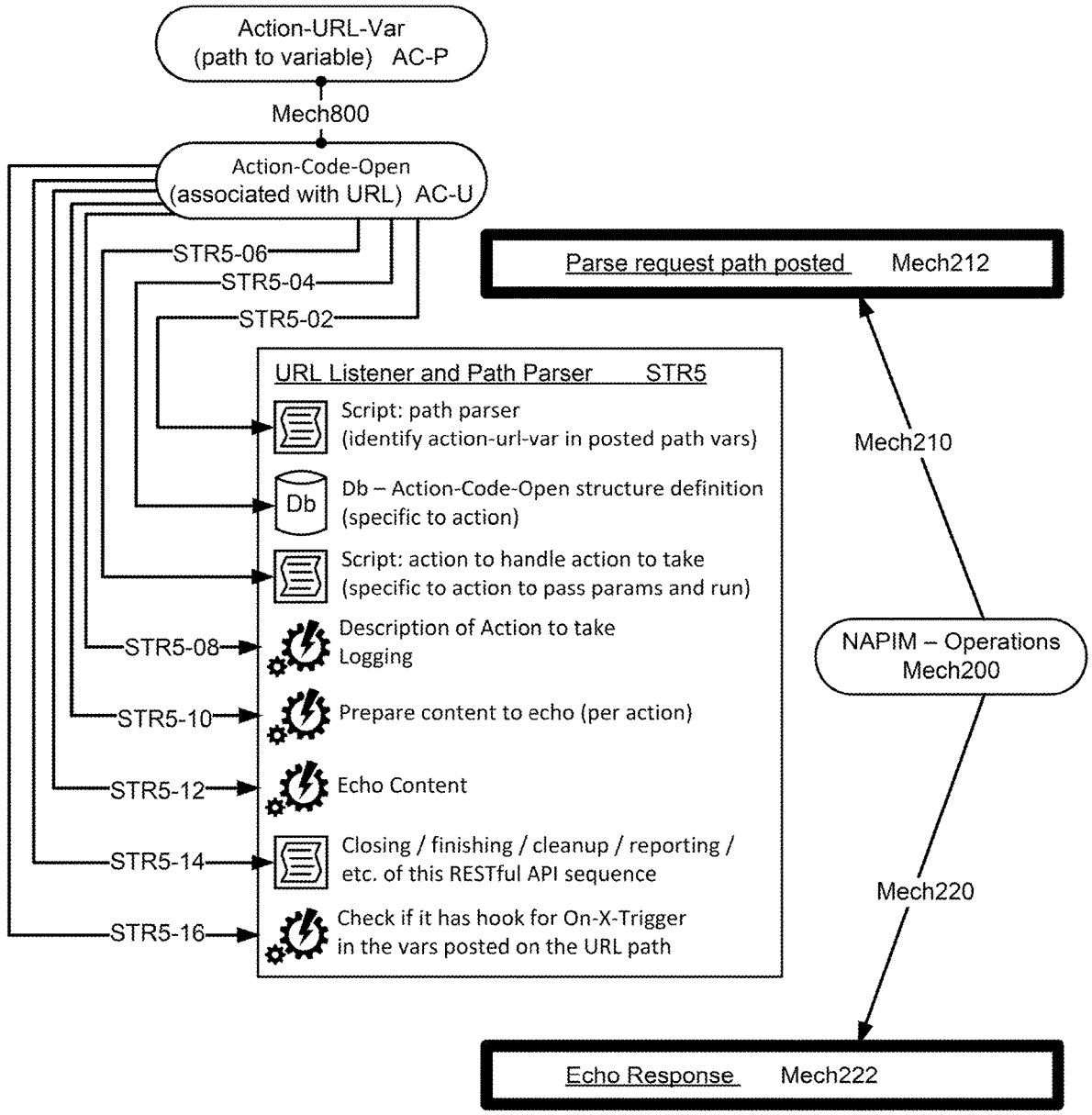
FIG. 16 shows a diagram illustrating example element mappings in a request/response payload, in an open/RESTFul loop, in accordance with an embodiment of the present disclosure.

FIG. 16 shows a diagram illustrating example element mappings in a request/response payload, in an open/RESTFul loop, in accordance with an embodiment of the present disclosure. This example embodiment illustrates the mapping of variables extracted from Action-URL-Var AC-P mapped to an Action-Code-Open AC-U to utilize the action associated with the URL vars. This is an aspect of the neutral API mechanism for fulfilling OPEN URL RESTful inquiries.

NAPIM—Operations Mech200 comprises parse request path posted Mech 212 (via Mech210) and echo response Mech 222 (via Mech220). The URL request is parsed to extract variables from the URL via Mech212. The Action-URL-VAR will be evaluated to find an Action-Code-Open AC-U association with a known action.

In some embodiments, URL Listener and Path Parser STR5 comprises the following elements: script STR5-02 as path parser identifies action-url-var in posted path vars; database stored Action-Code-Open structure definition (specific to action) STR5-04 may be used to parse; script STR5-06 processes the action; Logger STR5-08 performs logging; script STR5-10 prepares content to echo (per action); script STR5-14 handles closing, finishing, cleaning up, reporting, etc. of this RESTFul API sequence; script STR5-16 checks if it has hook for On-X-Trigger in the vars posted on the URL path.

The above elements of STR5 can be utilized to handle RESTful OPEN requests mapped to defined actions within the neutral API mechanism. Not all are necessary and other elements not indicated in this example embodiment may also be utilized for one, many or all actions. Results may be echoed back via Mech222.

In some embodiments, not every action is accessible via an OPEN/RESTful API call. This is dynamically defined per action and can also be depended or dependent on a number of factors, including the possible requirement of a posted variable in addition to variables harvested from the original URL path request.

Figure 17:
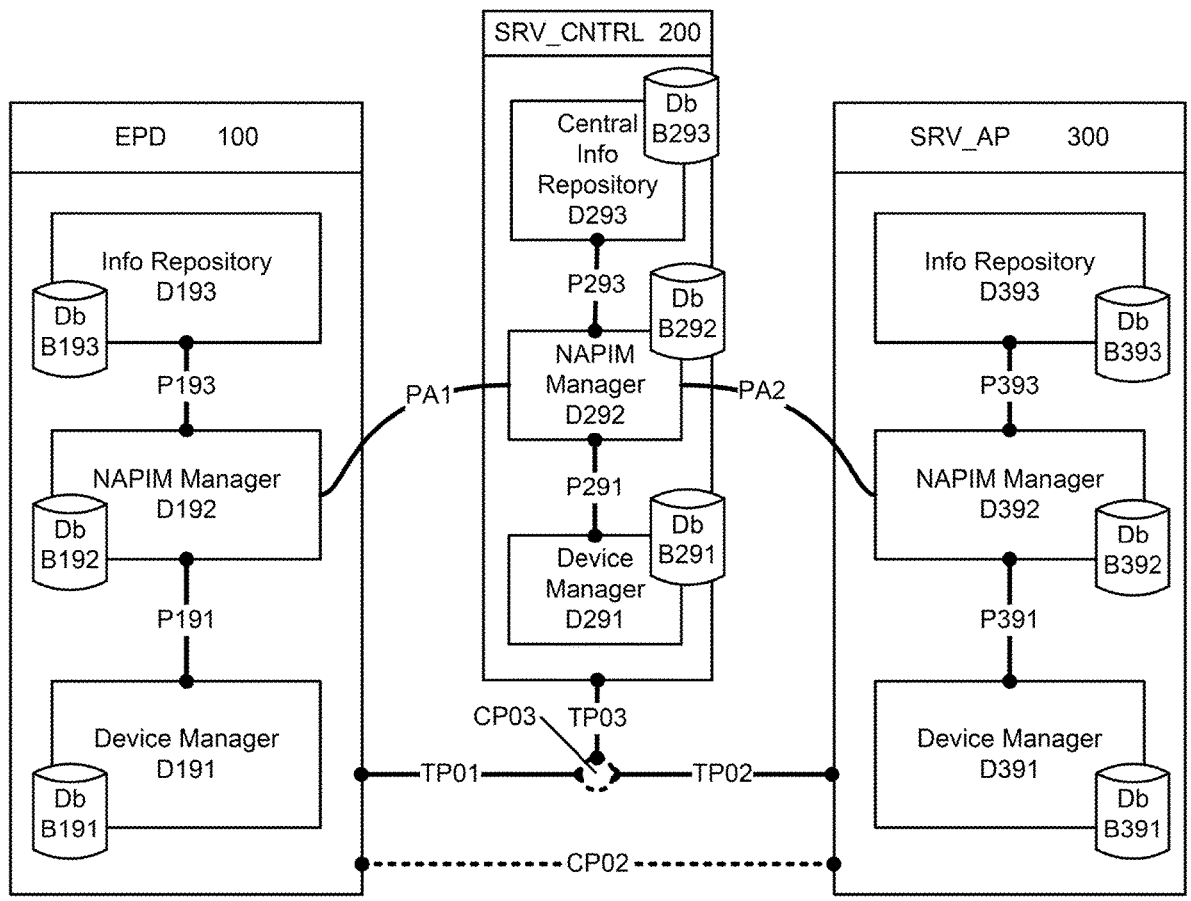
FIG. 17 shows a diagram illustrating collaboration and relationship among main modules used by the neutral API mechanism, in accordance with an embodiment of the present disclosure.

FIG. 17 shows a diagram illustrating collaboration and relationship among main modules used by the neutral API mechanism, in accordance with an embodiment of the present disclosure. This example embodiment illustrates core modules of the neutral API mechanism including the related paths for communication between devices.

The devices illustrated are an end point device EPD 100, a central, control server SRV_CNTRL 200, and an access point server SRV_AP 300. Other device types may also participate in the NAPIM and communicate with each other.

In some embodiments, on each peer device, there is an info repository, such as the info repository D193 on the EPD 100 and the info repository D393 on the SRV_AP 300. Each info repository may have an associated database such as B193 for D193, and B393 for D393. All devices may receive updated information for their local info repository via API call or other information conveyance method from the Central Info Repository D293 on the SRV_CNTRL 200. This central repository D293 may have an associated database B293. Info repository D193/D293/D393 may store API/action information, including but not limited to scripts related to an action, a definition related to the action, availability of the action (e.g., via a flag that indicates the availability), deprecation of the action (e.g., via a flag that indicates the action is deprecated). The definition may enable creating and parsing of the payload (e.g., response payload and request payload) of the action.

In some embodiments, Device Managers D191, D291, and D391 may have information stored in databases B191, B291 and B391, etc. for the device to have information about itself. This can be seeded locally at set up of the device or through the lifetime of the device, be seeded or updated by API calls to/from the SRV_CNTRL 200.

In some embodiments, each device may have a NAPIM manager such as D192 on EPD 100, D392 on SRV_AP 300 and D292 on SRV_CNTRL 200. These managers handle the operation of the framework of the NAPIM.

In some embodiments, API action codes, scripts, classes, definitions, and other supporting methods are managed by the NAPIM managers, including ensuring that the mechanism is up to date, that dependencies are in place, and other elements are functional to ensure smooth operations of the NAPIM.

In some embodiments, updates from devices to SRV_CNTRL 200 are via PA1 or PA2 or other direct P-2-CNTRL routes or calls. These can be initiated from either end.

In some embodiments, communications paths TP01 via CP03 to TP02 could represent a tunnel to push traffic between an EPD 100 and an SRV_AP 300. Or other type of communication and/or device interaction.

In some embodiments, path CP02 could represent either a direct tunnel between devices, an API call in either direction, or other type of communication between an EPD 100 and an SRV_AP 300.

The above nine points are examples of possibilities. More are also possible. The key point is that the rigid outer framework, posting, listening, handling and other aspects of the neutral API mechanism combined with a virtually unlimited amount of dynamically updateable actions offer incredible flexibility while at the same time securely automating and simplifying many aspects of API frameworks and relationships of peers therein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for neutral application programming interfaces, comprising:
   a control server;
   a plurality of second servers; and
   an access point server, wherein each said server comprises one or more computer processors, the access point server storing a plurality of scripts that enable the server to process a corresponding plurality of actions, wherein the access point server is configured to:
receive a request from an originating device, wherein the request comprises an outer payload and an inner payload;
parse the outer payload based on a common definition of the outer payload;
extract information identifying a first action among the plurality of actions from the outer payload;
in response to identifying the first action, select a first script among the plurality of scripts, wherein the first script enables the access point server to process the first action, wherein processing the first action is dependent on a plurality of dependencies, wherein processing the plurality of dependencies includes triggering the control server to launch a plurality of application programming interface (API) calls to put the plurality of dependencies in place;
receive information from the control server indicating whether the plurality of dependencies are in place; and
in response to the received information indicating that the plurality of dependencies are in place:
parse the inner payload based on a definition of the first action; and
execute, based on the parsed inner payload, the first script to process the first action, and
wherein the control server is configured to:
launch the plurality of API calls to the plurality of second servers in series or in parallel when triggered by the access point server, wherein the plurality of API calls configure the plurality of second servers with configuration information sufficient to build a tunnel between the originating device and a destination server among the plurality of second servers, wherein the originating device and the destination server constitute ends of the tunnel, and wherein the tunnel extends from the originating device through each remaining server among the plurality of second servers to the destination server;
receive a plurality of second responses indicating that the tunnel has been built; and
evaluate a result of the first action in response to receiving the plurality of second responses.

2. The system according to claim 1, wherein the outer payload comprises a timestamp of a time when the request is generated.

3. The system according to claim 2, wherein the inner payload is encrypted and the server is further configured to decrypt the inner payload.

4. The system according to claim 2, wherein the access point server is configured not to process the action if a time lapse between when the access point server receives the request and the timestamp is beyond a threshold.

5. The system according to claim 4, wherein the threshold is based on network latency.

6. The system according to claim 4, wherein the threshold is variable.

7. The system according to claim 3, wherein the encryption of the inner payload is based on the timestamp and the first action.

8. The system according to claim 7, wherein the encryption of the inner payload is further based on the originating device that originates the request.

9. The system according to claim 1, wherein the request is transmitted via a secure sockets layer.

10. The system according to claim 1, wherein the inner payload comprises at least one of an array, a key value pair, an object, a data file, or a binary file.

11. The system according to claim 1, wherein a second server is configured to store information associated with the plurality of actions.

12. The system according to claim 11, wherein the second server is further configured to store a peer relationship of the originating device and a destination device.

13. The system according to claim 11, wherein the second server is further configured to update one or more actions among the plurality of actions.

14. The system according to claim 12, wherein the access point server is further configured to retrieve a list of its peer originating devices from the second server; and listens to requests from a device that is on the list of its peer originating devices.

15. The system according to claim 11, wherein the second server is further configured to push one or more actions among the plurality of actions to the access point server.

16. The system according to claim 11, wherein the second server is further configured to flag one or more actions among the plurality of actions to denote availability.

17. The system according to claim 1, wherein the access point server is further configured to send a response to the request.

18. The system according to claim 17, wherein the access point server is further configured to include a portion of the request in the response.

19. A method for neutral application programming interfaces, comprising:
receiving, by an access point server, a request from an originating device, wherein the request comprises an outer payload and an inner payload;
parsing, by the access point server, the outer payload based on a common definition of the outer payload;
extracting, by the access point server, information identifying a first action among a plurality of actions from the outer payload;
in response to identifying the first action, selecting, by the access point server, a first script among a plurality of scripts, wherein each script among the plurality of scripts includes instructions for processing a corresponding action among the plurality of actions, wherein the first script includes instructions for processing the first action, wherein processing the first action is dependent on a plurality of dependencies, wherein processing the plurality of dependencies includes triggering a control server to launch a plurality of application programming interface (API) calls to put the plurality of dependencies in place;
receiving information from the control server indicating whether the plurality of dependencies are in place; and
in response to the received information indicating that the plurality of dependencies are in place:
parsing the inner payload based on a definition of the first action; and
processing the first action by executing, based on the parsed inner payload, the first script,
wherein the control server is configured to:
launch the plurality of API calls to the plurality of second servers in series or in parallel when triggered by the access point server, wherein the plurality of API calls configure the plurality of second servers with configuration information sufficient to build a tunnel between the originating device and a destination server among the plurality of second servers, wherein the originating device and the destination server constitute ends of the tunnel, and wherein the tunnel extends from the originating device through each remaining server among the plurality of second servers to the destination server;

receive a plurality of second responses indicating that the tunnel has been built; and evaluate a result of the first action in response to receiving the plurality of second responses.

20. The method according to claim 19, wherein the outer payload comprises a timestamp of a time when the request is generated.

21. The method according to claim 20, wherein the inner payload is encrypted and the method further comprises decrypting the inner payload.

22. The method according to claim 20, wherein the action is not processed if a time lapse between receiving the request and the timestamp is beyond a threshold.

23. The method according to claim 22, wherein the threshold is based on network latency.

24. The method according to claim 22, wherein the threshold is variable.

25. The method according to claim 21, wherein the encryption of the inner payload is based on the timestamp and the first action.

26. The method according to claim 25, wherein the encryption of the inner payload is further based on the originating device that originates the request and a device that receives the request.

27. The method according to claim 19, wherein the request is transmitted via a secure sockets layer.

28. The method according to claim 19, wherein the inner payload comprises at least one of an array, a key value pair, an object, a data file, or a binary file.

29. The method according to claim 20, further comprising storing, by a second server, the plurality of scripts.

30. The method according to claim 29, further comprising:
storing, by the second server, a peer relationship of the originating device and a destination device.

31. The method according to claim 29, further comprising updating, by the second server, one or more actions among the plurality of actions.

32. The method according to claim 30, further comprising: retrieving, by the access point server, a list of peer originating devices from the second server; and listening to requests from a device that is on the list of the peer originating devices.

33. The method according to claim 29, further comprising: pushing, by the second server, one or more actions among the plurality of actions to a device.

34. The method according to claim 29, further comprising flagging, by the second server, one or more actions among the plurality of actions to denote availability.

35. The method according to claim 19, further comprising sending, by the access point server, a response to the request.

36. The method according to claim 35, further comprising: including, by the access point server, a portion of the request in the response.

37. A non-transitory computer readable medium storing a computer-readable program of neutral application programming interfaces, comprising:

computer-readable instructions to receive, by an access point server, a request from an originating device, wherein the request comprises an outer payload and an inner payload;

computer-readable instructions to parse, by the access point server, the outer payload based on a common definition of the outer payload;

computer-readable instructions to extract, by the access point server, information identifying a first action among a plurality of actions from the outer payload;

computer-readable instructions to select, by the access point server, a first script among a plurality of scripts, wherein each script among the plurality of scripts includes instructions for processing a corresponding action among the plurality of actions, wherein the first script includes instructions for processing the first action, wherein processing the first action is dependent on a plurality of dependencies, and wherein processing the plurality of dependencies includes triggering a control server to launch a plurality of application programming interface (API) calls to put the plurality of dependencies in place;

computer-readable instructions to receive, by the access point server, information from the control server indicating whether the plurality of dependencies are in place; and computer-readable instructions to parse, by the access point server, the inner payload based on a definition of the first action; and computer-readable instructions to process the first action by executing, based on the parsed inner payload, the first script, wherein the control server is configured to:
launch the plurality of API calls to the plurality of second servers in series or in parallel when triggered by the access point server, wherein the plurality of API calls configure the plurality of second servers with configuration information sufficient to build a tunnel between the originating device and a destination server among the plurality of second servers, wherein the originating device and the destination server constitute ends of the tunnel, and wherein the tunnel extends from the originating device through each remaining server among the plurality of second servers to the destination server;

receive a plurality of second responses indicating that the tunnel has been built; and evaluate a result of the first action in response to receiving the plurality of second responses.

38. The system according to claim 1, wherein the device is further configured to queue the first action for processing.

39. The system according to claim 1, wherein the device is further configured to log the request and the first action.

40. The method according to claim 19, further comprising queueing the first action for processing.

41. The method according to claim 19, further comprising logging the request and the first action.

* * * * *